US012561136B2

(12) United States Patent
Maciel Dos Santos et al.

(10) Patent No.: US 12,561,136 B2
(45) Date of Patent: Feb. 24, 2026

(54) METHOD, APPARATUS, AND SYSTEM FOR OUTPUTTING SOFTWARE DEVELOPMENT INSIGHT COMPONENTS IN A MULTI-RESOURCE SOFTWARE DEVELOPMENT ENVIRONMENT

(71) Applicant: ATLASSIAN PTY LTD., Sydney (AU)

(72) Inventors: Gustavo Maciel Dos Santos, Sydney (AU); Terry John Agapitos, Sydney (AU); Sumanth Nagadavalli Suresh, Sydney (AU); Patrick Sven Streule, Sydney (AU)

(73) Assignee: ATLASSIAN PTY, LTD., Sydney (AU)

( * ) Notice: Subject to any disclaimer, the term of this patent is extended or adjusted under 35 U.S.C. 154(b) by 218 days.

(21) Appl. No.: 18/344,437

(22) Filed: Jun. 29, 2023

(65) Prior Publication Data
US 2025/0004760 A1     Jan. 2, 2025

(51) Int. Cl.
*G06F 8/77* (2018.01)

(52) U.S. Cl.
CPC ..................................... *G06F 8/77* (2013.01)

(58) Field of Classification Search
CPC .......................................................... G06F 8/77
USPC ......................................... 717/102, 101, 103
See application file for complete search history.

(56) References Cited

U.S. PATENT DOCUMENTS

| | | | | |
|---|---|---|---|---|
| 7,735,062 B2 * | 6/2010 | de Seabra e Melo | .. | G06F 9/451 |
| | | | | 715/229 |
| 10,853,137 B2 * | 12/2020 | Haprian | .............. | G06F 11/3006 |
| 11,640,295 B2 * | 5/2023 | Tepper | .................... | G06N 3/08 |
| | | | | 717/123 |
| 2007/0168918 A1 * | 7/2007 | Metherall | .............. | G06Q 10/06 |
| | | | | 717/101 |
| 2020/0293372 A1 * | 9/2020 | Haprian | .............. | G06F 11/3006 |
| 2020/0326934 A1 * | 10/2020 | Tepper | .................. | G06N 3/044 |
| 2022/0004967 A1 * | 1/2022 | Trim | ........................ | G06N 3/08 |
| 2025/0004760 A1 * | 1/2025 | Maciel Dos Santos | .. | G06F 8/20 |

* cited by examiner

*Primary Examiner* — Wei Y Mui
*Assistant Examiner* — Amir Soltanzadeh
(74) *Attorney, Agent, or Firm* — Alston & Bird LLP

(57) ABSTRACT

Methods, apparatuses, or computer program products provide for outputting software development insight components to a software development insight interface. A multi-resource software development work graph structure associated with one or more development unit identifiers may be retrieved. The multi-resource software development work graph structure may be configured to represent relationships among a code pull request set and an issue object set that are associated with the one or more development unit identifiers. A software development context object associated with the one or more development unit identifiers may be received. One or more software development insight components may be determined by traversing the multi-resource software development work graph structure based on the software development context object. One or more software development insight components may be outputted for rendering to the software development insight interface.

18 Claims, 7 Drawing Sheets

200

300

Software Development Insight Interface

402

404

Software Development Insight Components

1. Automate issue ID 13467

2. Code Pull Request ID 23777 has been open for over two weeks.

3. Code Pull Request ID 23777 is a bottleneck.

4. Issue objects 12567, 34567, and 89746 are each dependent on Code Pull Request ID 23777 and will be delayed.

5. Pull Request ID 57888 should be worked on next.

6. Use Bitbucket to complete Code Pull Request ID 15667.

IDENTIFY A PLURALLITY OF RESOURCE OBJECTS — 502

FOR EACH RESOURCE OBJECT, EXTRACT ONE OR MORE FEATURES — 504

FOR EACH RESOURCE OBJECT, IDENTIFY A RELATIONSHIP BETWEEN THE RESOURCE OBJECT AND EACH OTHER RESOURCE OBJECT BASED ON THE ONE OR MORE FEATURES — 506

GENERATE A MULTI-RESOURCE SOFTWARE DEVELOPMENT WORK GRAPH STRUCTURE BASED ON EACH RSOURCE OBJECT RELATIONSHIP — 508

IDENTIFY A MULTI-RSOURCE SOTWARE DEVELOMENT WORK GRAPH STRUCTURE — 602

TRAIN AN INSIGHT PREDICTION MACHINE LEARNING MODEL BASED ON THE MULTI-RESOURCE WORK GRAPH STRUCTURE — 604

RE-TRAIN THE INSIGHT PREDICTION MACHINE LEARNING MODEL BASED ON UPDATED MULTI-RESOURCE WORK GRAH STRUCTURE — 606

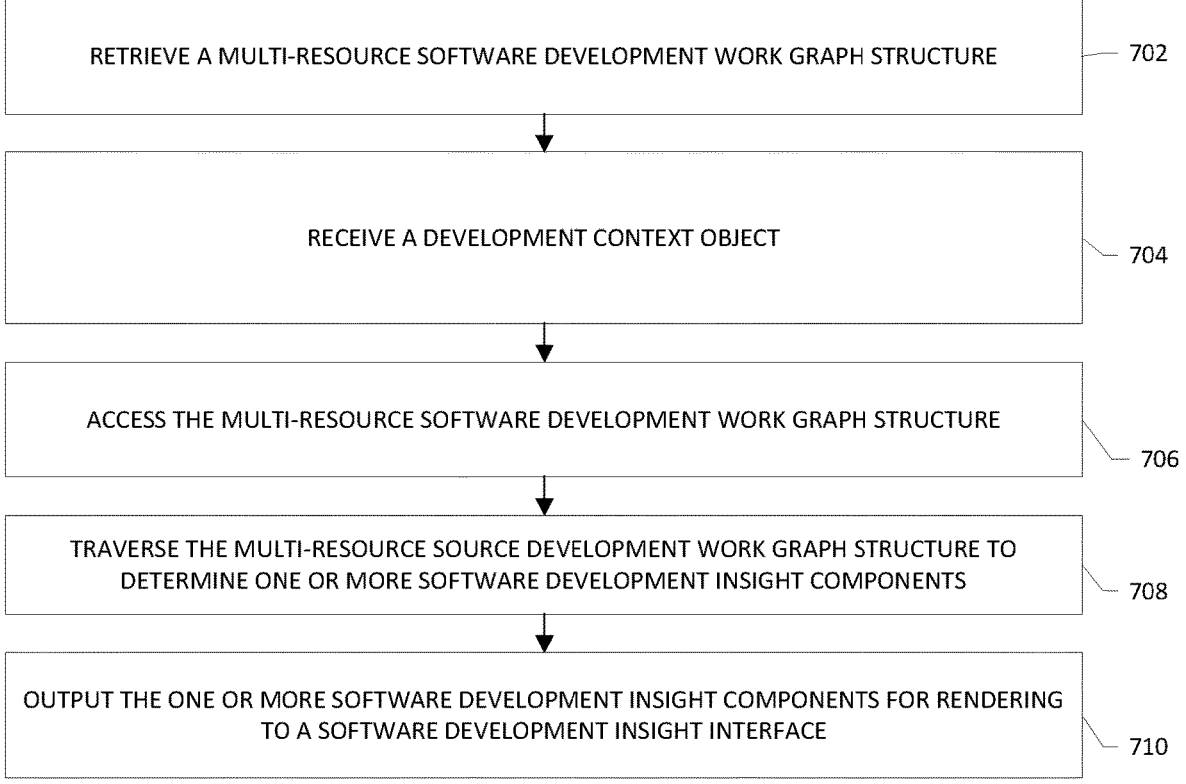

RETRIEVE A MULTI-RESOURCE SOFTWARE DEVELOPMENT WORK GRAPH STRUCTURE — 702

RECEIVE A DEVELOPMENT CONTEXT OBJECT — 704

ACCESS THE MULTI-RESOURCE SOFTWARE DEVELOPMENT WORK GRAPH STRUCTURE — 706

TRAVERSE THE MULTI-RESOURCE SOURCE DEVELOPMENT WORK GRAPH STRUCTURE TO DETERMINE ONE OR MORE SOFTWARE DEVELOPMENT INSIGHT COMPONENTS — 708

OUTPUT THE ONE OR MORE SOFTWARE DEVELOPMENT INSIGHT COMPONENTS FOR RENDERING TO A SOFTWARE DEVELOPMENT INSIGHT INTERFACE — 710

FIG. 7

METHOD, APPARATUS, AND SYSTEM FOR OUTPUTTING SOFTWARE DEVELOPMENT INSIGHT COMPONENTS IN A MULTI-RESOURCE SOFTWARE DEVELOPMENT ENVIRONMENT

BACKGROUND

Various methods, apparatuses, and systems provide tools for users to plan, collaborate, execute, and monitor software development projects. Applicant has identified many deficiencies and problems associated with tools for executing, assessing, and improving software development related activities. Through applied effort, ingenuity, and innovation, many of these identified deficiencies and problems have been solved by developing solutions that are configured in accordance with the embodiments of the present disclosure, many examples of which are described in detail herein.

BRIEF SUMMARY

Embodiments of the present disclosure relate to apparatuses, methods, and computer program products for outputting software development insight components to a software development insight interface.

In accordance with one aspect, an apparatus comprising at least one processor and at least one memory including computer program code is provided. In one embodiment, the at least one memory and the computer program code may be configured to, with the processor, cause the apparatus to: retrieve a multi-resource software development work graph structure associated with one or more development unit identifiers, wherein the multi-resource software development work graph structure is configured to represent relationships among a code pull request set and an issue object set that are associated with the one or more development unit identifiers; receive a software development context object associated with the one or more development unit identifiers; determine one or more software development insight components by traversing the multi-resource software development work graph structure based on the software development context object; and output the one or more software development insight components for rendering to the software development insight interface.

In accordance with another aspect, a method is provided. In one embodiment, the method comprises: retrieving a multi-resource software development work graph structure associated with one or more development unit identifiers, wherein the multi-resource software development work graph structure is configured to represent relationships among a code pull request set and an issue object set that are associated with the one or more development unit identifiers; receiving a software development context object associated with the one or more development unit identifiers; determining one or more software development insight components by traversing the multi-resource software development work graph structure based on the software development context object; and outputting the one or more software development insight components for rendering to the software development insight interface.

In accordance with another aspect, a computer program product is provided. The computer program product may comprise at least one computer-readable storage medium having computer-readable program code portions stored therein, the computer-readable program code portions comprising executable portions configured to: retrieve a multi-resource software development work graph structure associated with one or more development unit identifiers, wherein the multi-resource software development work graph structure is configured to represent relationships among a code pull request set and an issue object set that are associated with the one or more development unit identifiers; receive a software development context object associated with the one or more development unit identifiers; determine one or more software development insight components by traversing the multi-resource software development work graph structure based on the software development context object; and output the one or more software development insight components for rendering to the software development insight interface.

BRIEF DESCRIPTION OF THE SEVERAL VIEWS OF THE DRAWINGS

Figure 1:
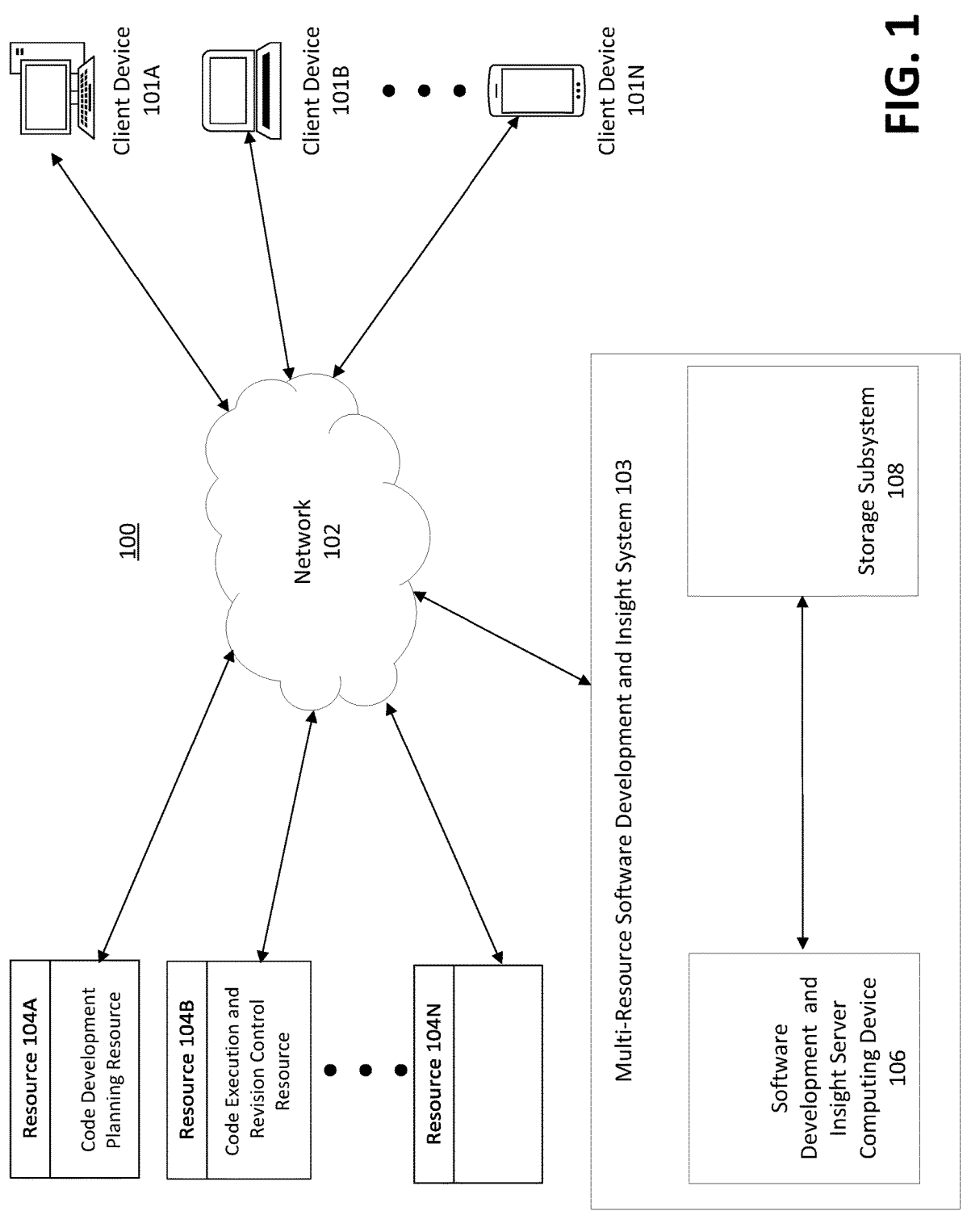

Having thus described some embodiments in general terms, references will now be made to the accompanying drawings, which are not drawn to scale, and wherein:

FIG. 1 illustrates an example multi-resource software development and insight system in accordance with at least some embodiments of the present disclosure.

Figure 2:
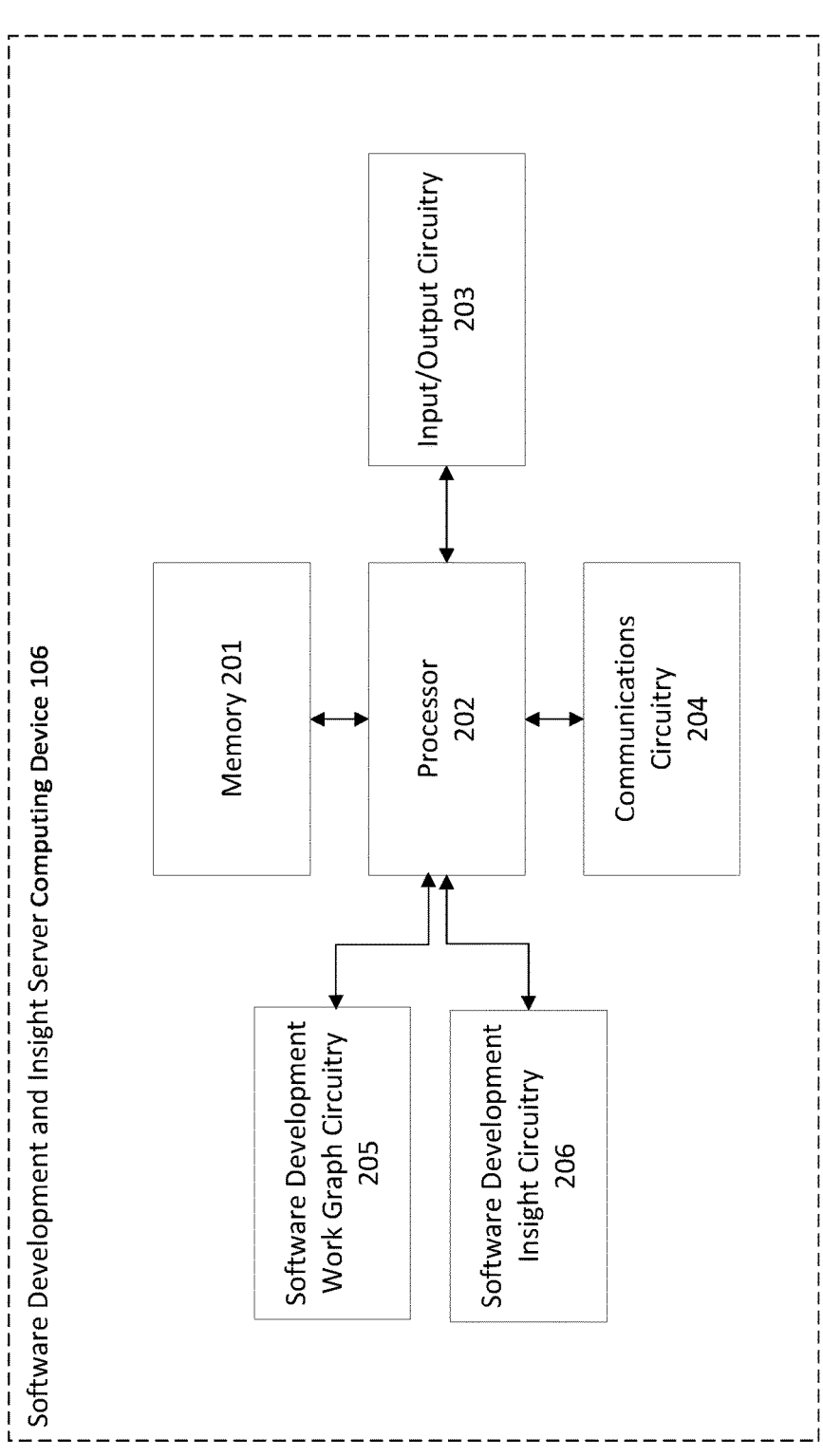

FIG. 2 illustrates a schematic block diagram of example apparatus to perform various operations in accordance with at least some embodiments of the present disclosure.

Figure 3:
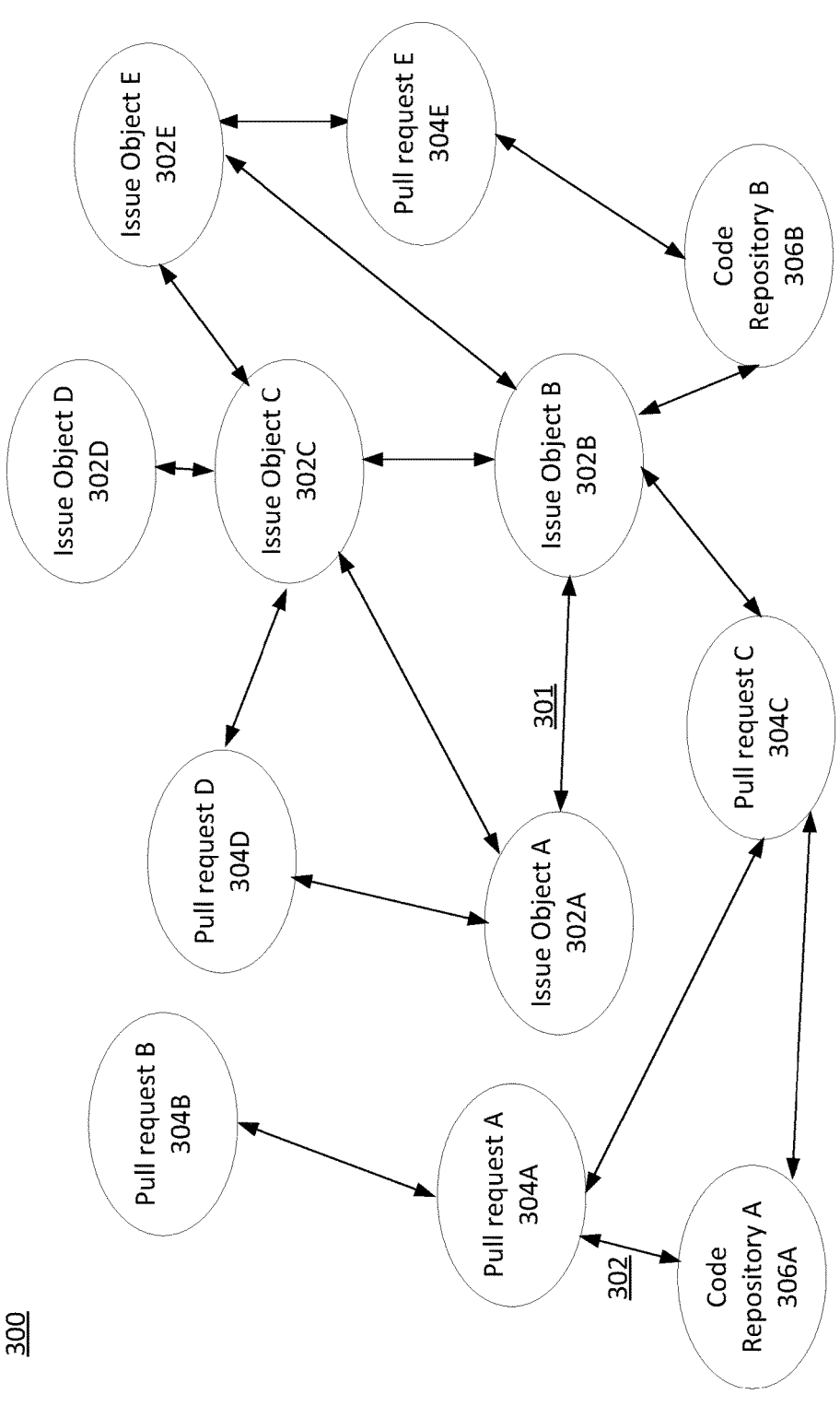

FIG. 3 provides an operational example of a multi-resource software development work graph structure in accordance with at least some embodiments of the present disclosure.

Figure 4:
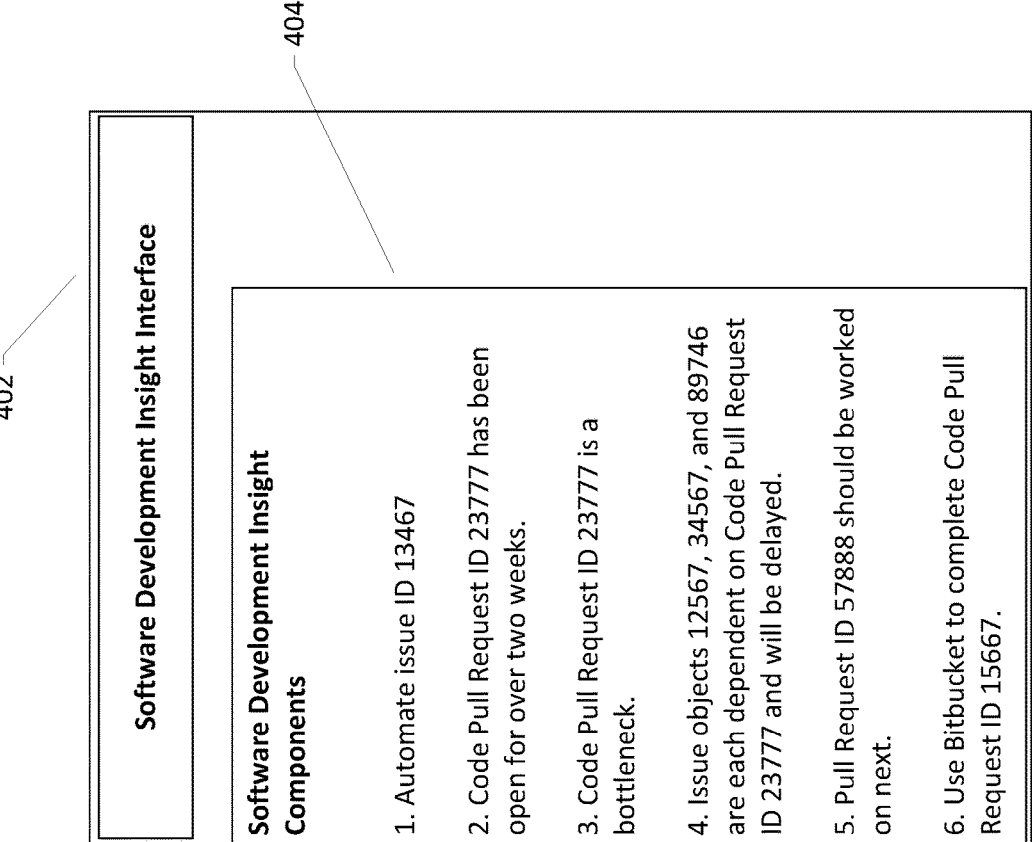

FIG. 4 illustrates an example software development insight component rendered to a software development insight interface in accordance with at least some embodiments of the present disclosure.

Figure 5:
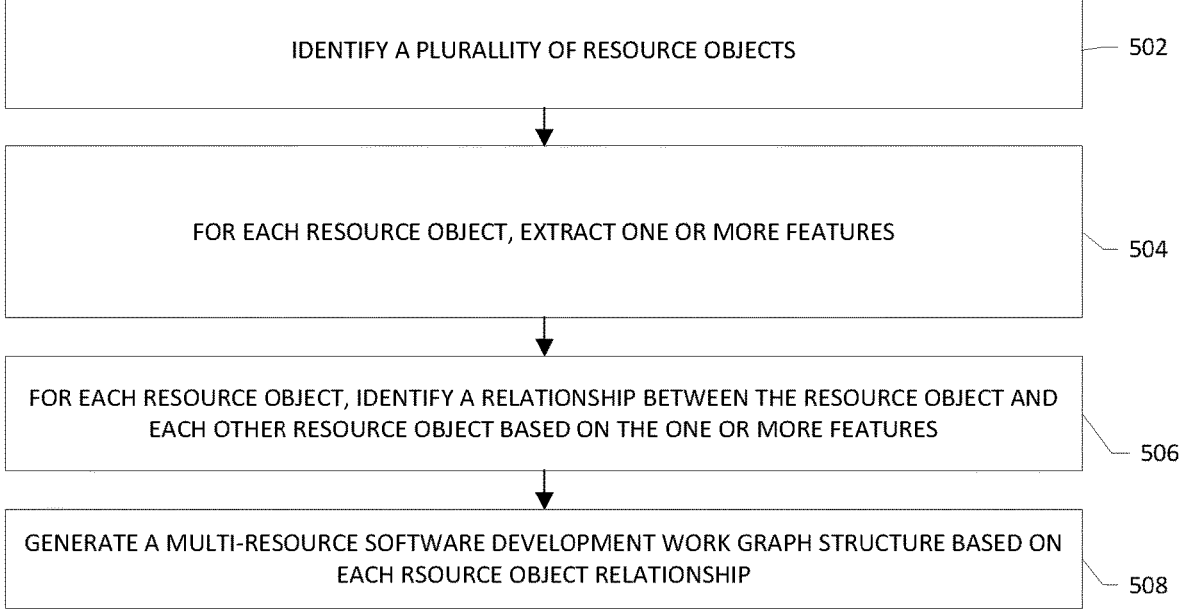

FIG. 5 is a flowchart illustrating example operations for generating a multi-resource software development work graph structure in accordance with at least some embodiments of the present disclosure.

Figure 6:
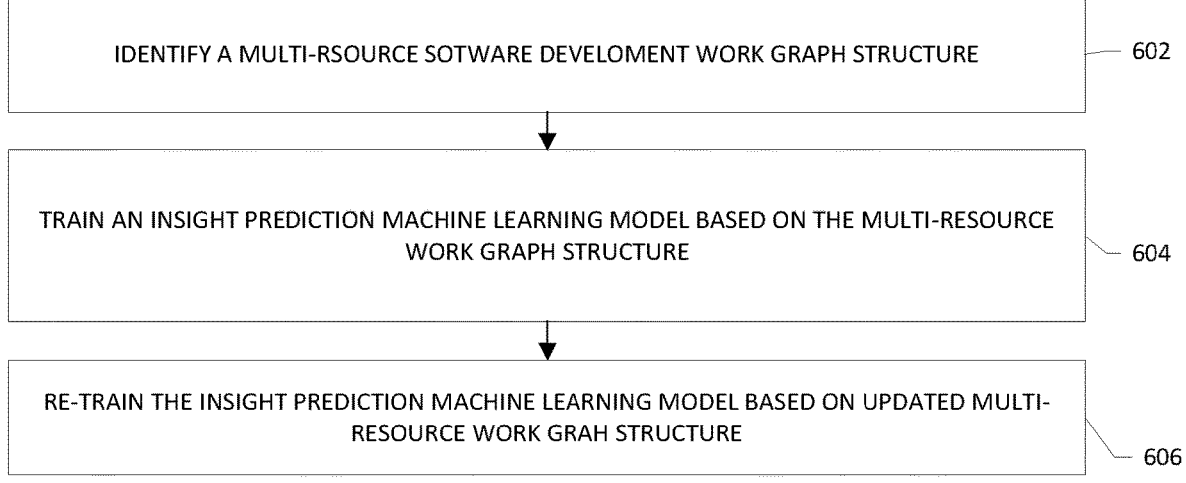

FIG. 6 is a flowchart illustrating example operations for training and/or re-training an insight prediction machine learning model in accordance with at least some embodiments of the present disclosure.

FIG. 7 is a flowchart illustrating example operations for outputting software development insight components in accordance with at least some embodiments of the present disclosure.

DETAILED DESCRIPTION

Embodiments of the present disclosure now will be described more fully hereinafter with reference to the accompanying drawings, in which some, but not all, embodiments of the disclosure are shown. Indeed, embodiments of the present disclosure may be embodied in many different forms and should not be construed as limited to the embodiments set forth herein, rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based on in part on," "based at least on," "based upon," and/or similar words are used herein interchangeably in an open-ended manner such that they do not indicate being based only on or based solely on the referenced element or elements unless so indicated. Like numbers refer to like elements throughout.

Overview and Technical Improvements

Various embodiments of the present invention address technical problems associated with various phases of software development, including ideating phase, planning phase, building phase, testing phase, deploying phase and operating phase. In particular, one or more embodiments of the present invention address technical problems associated with planning, executing, monitoring, assessing, and improving software development tasks and related products in a multi-resource software development environment. Generally, a software development project may be divided into smaller units of works to be delivered in one or more small increments, such as sprint(s). As such, a single software development project may be associated with numerous tasks and/or sub-tasks that may, for example, have a dependency relationship.

In a multi-resource software development environment, each unit of work may be associated with one or more resources (e.g., software development operations tools or applications) configured to interact with one other. For example, a software development team may utilize Jira® by Atlassian for code development project management and planning and may utilize GitHub® by Atlassian for code execution, release, and revision control. A software development team may use other resources for facilitating various other tasks and/or sub-tasks associated with the software development.

As software platforms become more and more complex, particularly in federated cloud architectures comprised of hundreds of interrelated services and microservices, it may not be readily apparent to a software development team planner how best to execute and deliver a particular software development project. Such a planner may have an idea as to which software development resources they believe might be used by the team, but they may not be able to gain a sense for the comprehensive or holistic view of the complex interactions of the chosen software development resources in the context of the highly complex federated system architecture. This makes it difficult to identify bottlenecks, inefficiencies, opportunities for improvements, and/or the like, in the deployment and use of software development resources.

In one example, a planning user may find it challenging to identify gaps, such as units of work, which are required for executing a particular software development project in complex software system architecture but which are not readily apparent. Missing these gaps can cause erroneous projections with respect to, for example, commitments, assigning tasks, team member allocation, etc. In another example, a team member working on the particular software development project may find it challenging to identify the next, most efficient, task (e.g., next code pull request) to work on. Said differently, while a team member might identify a next obvious task to complete, they might miss a less obvious task that, if completed, would improve the overall efficiency of the particular software development project.

Applicant has identified a need for providing a system configured to programmatically analyze complex relationships among various software development resources used in a multi-resource software development environment and provide insights to users (e.g., team members, planning users, etc.) to improve execution of software development projects. Such improved execution might involve more effective planning, executing, monitoring, assessing, and scheduling software development tasks and the identification and deployment of software development tools.

Example embodiments of the present disclosure include generating a multi-resource software development work graph structure representing relationships among various software development resources/tools, including a code development planning resource (e.g., Jira) and a code execution and revision control resource (e.g., GitHub). In some embodiments, the multi-resource software development work graph structure represents relationships between code pull requests of the code execution and revision control resource and issue objects of the code development planning resource.

Example embodiments are further configured to detect and/or receive software development context object(s), traverse the multi-resource software development work graph structure, generate inferences, and determine software development insight component(s) based on such inferences. The determined software development insight components are output for rendering to a software development insight interface for display on a client device.

Example embodiments of the present disclosure address the various deficiencies set forth above and otherwise described herein, while also providing various technical benefits. For example, some embodiments of the present disclosure increase the efficiency and effectiveness of various systems and resources associated with software development. Software development systems configured as discussed herein provide contextually relevant insights to users that can lead to improved allocation of system resources, including network and computer resources such as code repositories and other system assets, and reduced computation expense.

Definitions

The term "software development insight interface" refers to a graphical user interface or sub-user interface of a multi-resource software development and insight system that is configured to display one or more software development insight components. A software development insight interface may be rendered to a client device based on data and instructions provided by the multi-resource software development and insight system. In some embodiments, such data and instructions are facilitated by a dedicated software application running on the client device. In other embodiments, such data and instructions are provided through a web browser running on the client device.

The term "development unit" refers to a fundamental work development component, part, event and the like in a software development life cycle. In an example embodiment, development unit may refer to a project (e.g., software development project). In some embodiments, a development unit comprises one or more smaller development units or increments. For example, in some implementations a large, higher level development unit, such as a project, is delivered in one or more small increments, such as sprint(s). Non-limiting examples of a development unit include a project, an issue, a task, a work item, an iteration, a Kanban, and/or the like.

The terms "issue object," "issue," and similar terms as used herein can be used interchangeably to refer to a work item to be completed in a project development life cycle, such as a software development life cycle. For example, an issue object may represent individual work items such as a software development task. In one or more embodiments, issue objects include data and metadata that are arranged in a format or schema according to the code development and planning resource. Issue data objects may also refer to features, user requirements, software bugs, and other items that represent work.

In some examples, a code development and planning resource (e.g., such as Jira® by Atlassian) may utilize issue objects to facilitate code development planning, enabling a user or group of users to plan track, organize, schedule, and/or otherwise manage software development projects. An issue object may be associated with an issue type of a plurality of issue types (e.g., an epic, a bug, a story, a task, a sub-task, etc.), wherein each issue type may be associated with a hierarchy level. For example, in some implementations, an epic issue type may be associated with a higher hierarchy level relative to a bug issue type. An issue object may take the form of a data structure configured to represent at least one property/attribute of the issue object. For example, in some embodiments, an issue object may comprise one or more issues fields representing various properties/attributes of an issue object. (e.g., issue object identifier, due date, status, and/or the like). In some embodiments, an issue object may comprise a resource object associated with a resource.

The terms "code pull request," "code pull request object," and similar terms may be used interchangeably to refer to a data structure indicative of a request and/or notification that a particular code portion or snippet has been accessed, changed, or otherwise requires review. For example, a code pull request may comprise a mechanism for team members (e.g., developers in a software development environment) to notify other team members that a particular code branch or snippet has been completed and requires review by another team member (e.g., manager, reviewer, etc.) before merging into the relevant branch of a code repository (e.g., merging changes from a source branch to a destination branch within a code repository or across code repositories).

A code pull request may take the form of a data structure configured to represent at least one property/attribute of the targeted code and/or author associated with the code pull request. Such properties/attributes may include author identifier(s), reviewer identifier(s), development unit identifier(s), commit identifier(s), code identifier(s), source branch identifier(s), destination branch identifier(s), version identifier(s), timestamp(s) (e.g., date pull request was created, date the pull request was last updated, etc.), code pull request status (e.g., open, rejected, fulfilled), description of the request, links to related data and functionality, title of the pull request, comments, and/or the like. Additionally or alternatively, in one or more embodiments, a code pull request may include the code (e.g., targeted code) associated with the pull request and/or commit(s) associated with the pull request. In some examples, a code pull request may be generated in response to one or more commits. In some embodiments, a code pull request may comprise a resource object associated with or otherwise facilitated by a resource/tool (e.g., software development tool). For example, a code pull request may be facilitated by a code execution and revision control resource/tool, such as GitHub.

The term "development unit identifier" refers to one or more items of data by which a development unit may be uniquely identified within a multi-resource software development environment. For example, a development unit identifier may comprise one or more of ASCII text, encryption keys, identification certificates, a pointer, an IP address, a URL, a MAC address, a memory address, or other unique identifier, or combinations thereof.

The term "user identifier" refers to one or more items of data by which a user may be uniquely identified within a multi-resource software development environment. For example, a user identifier may comprise one or more of American Standard Code for Information Interchange (ASCII) text, encryption keys, identification certificates, a pointer, an Internet Protocol (IP) address, a URL, a MAC address, a memory address, or other unique identifier, or combinations thereof.

The term "team identifier" refers to one or more items of data by which a team or team unit comprising one or more team members may be uniquely identified within a multi-resource software development environment. For example, a team identifier may comprise one or more of ASCII text, encryption keys, identification certificates, a pointer, an IP address, a URL, a MAC address, a memory address, or other unique identifier, or combinations thereof.

The term "team member identifier" refers to one or more items of data by which a team member of a team may be uniquely identified within a multi-resource software development environment. For example, a team member identifier may comprise one or more of ASCII text, encryption keys, identification certificates, a pointer, an IP address, a URL, a MAC address, a memory address, or other unique identifier, or combinations thereof.

The term "code pull request identifier" refers to one or more items of data by which a pull request may be uniquely identified within a multi-resource software development environment. For example, a code pull request identifier may comprise one or more of ASCII text, encryption keys, identification certificates, a pointer, an IP address, a URL, a MAC address, a memory address, or other unique identifier, or combinations thereof.

The term "issue object identifier" refers to one or more items of data by which an issue object may be uniquely identified within a multi-resource software development environment. For example, an issue object identifier may comprise one or more of ASCII text, encryption keys, identification certificates, a pointer, an IP address, a URL, a MAC address, a memory address, or other unique identifier, or combinations thereof.

The term "resource," refers to a software program, application, platform, or service that is configured to provide software development functionality or a set of software functionalities, such as the retrieval of specified information or the execution of a set of software development operations. Non-limiting examples of a resource include a code development planning resource configured to provide code development planning and tracking, such as issue tracking, and a code execution and revision control resource configured to provide code execution and revision control, such as pull request management. In some embodiments, a resource can comprise an internal resource or an external resource.

The term "internal resource" refers to a software program, application, platform, or service that is configured by a software developer to provide functionality to another one or more of their software programs, applications, platforms, or services, either directly or indirectly through one or more other resources, as opposed to using an external resource. Internal resources operate on a compiled code base or repository that is at least partially shared by an application which utilizes the functionality provided by the internal resource. In some embodiments, the application code base and the internal resource code base are hosted on the same computing device or across an intranet of computing devices. An application communicates with internal resources within a shared architectural programming layer without external network or firewall separation. In some embodiments, an internal resource is used only within the application layer which utilizes the internal resource functionality. Information related to internal resources can be collected and compiled into resource objects which can also be referred to as internal resource objects.

The terms "external resource," "remote resource," or similar terms refer to a software program, application, platform, or service that is configured to communicate with another software program, application, platform, or service via a network architecture. In some embodiments, communications between an external resource and an application calling the external resource takes place through a firewall and/or other network security features. The external resource operates on a compiled code base or repository that is separate and distinct from that which supports the application calling the external resource. The external resources of some embodiments generate data or otherwise provide usable functionality to an application calling the external resource. In other embodiments, the application calling the external resource passes data to the external resource. In some embodiments, the external resource may communicate with an application calling the external resource, and vice versa, through one or more application program interfaces (APIs). For example, the application calling the external resource may subscribe to an API of the external service that is configured to transmit data.

The term "resource data" refers to one or more items of data related to resources associated with software development in a multi-resource software development environment. Non-limiting examples of resource data include, but not limited to, code pull request identifiers, issue object identifiers, resource provider identifiers, user identifier(s), development unit identifier(s), subsidiary development unit identifier(s), team identifier(s), development unit activity data, subsidiary development unit activity data, resource identifiers, current performance data, expected performance data, timestamp(s) associated with a code pull request (e.g., date created, date reviewed, date merged, data last updated, etc.), timestamp(s) associated with an issue object (e.g., data created, date closed, date last updated, etc.), code pull request author(s)/issuer(s), code pull request reviewer(s), issue object author(s)/issuer(s), commit data, commitment data, and/or the like.

The term "software development context object" refers to an electronically generated digital object created by a computing device to trigger generation of software development insight component(s). For example, a software development context object may represent a request to generate, transmit, and/or display one or more software development insight components. A software development context object may provide a context for determining contextually relevant software development insight components. In some embodiments, a software development context object includes one or more of a development unit identifier, a user identifier, a team identifier, a project identifier, a code pull request identifier, an issue object identifier, and/or the like. In example embodiments, a software development context object may be generated in response to a user interaction with a user interface (e.g., software development insight interface, project management user interface), wherein the user interaction causes the computing device to generate a software development context object. For example, a software development context object may be generated in response to a hover user interaction, such as, for example, a user hovering over a particular region of a user interface. As another example, a software development context object may be generated in response to a user input interaction, such as, for example, a user interacting with (e.g., clicking, pressing) a create development unit actuator button (e.g., "Create Sprint"), a user interacting with a software development insight actuator button (e.g., "Insights" or Show Insights"), and/or the like.

The term "software development insight components" refers to a graphical interface component embodying data and/or features (insights) provided to a user in context to facilitate efficient and effective software development, such as efficient and effective planning, executing, monitoring, assessing, and improving of software development tasks and related products in a multi-resource software development environment. For example, a software development insight component may comprise data and/or features configured to help user(s) solve a specific job/task. As another example, a software development insight component may comprise data/feature configured to help user(s) understand areas of a development unit to focus on to improve efficiency, cycle time, and/or other performance metrics associated with software development. A software development insight component, for example, may comprise data/feature configured to help user(s) understand the status of work across a multi-resource software development environment/toolchain (e.g., where the work is, what needs to be done), manage dependencies (e.g., task dependencies), coordinate who picks up work or assigned work, report on work progress, manage unplanned work (e.g., generate work across the multi-resource software development environment/toolchain based on software development insight components such as "bugs" that are identified across the various resources/tools in the multi-resource software environment/toolchain). As yet another example, a software development insight component may comprise data/feature configured to help user(s) understand bottlenecks and identify opportunities for improvement. As further example, a software development insight component may comprise data/feature configured to help streamline software development collaboration workflows, such as automating across the multi-resource software development environment to facilitate the flow of work and keep resources/tools and/or their data aligned (e.g. in sync). As such making the resources and/or associated systems more reliable and trustworthy, while improving efficiency of teams that would otherwise be manually updated (thus, prone errors).

As yet another example, a software development insight component may comprise recommendations, such as unused resources/tools available to a team and determined to be most suitable for solving a specific job/task. In some embodiments, a software development insight component can embody actionable insights, such as recommendations to a user to take a particular action, conversation with a user (e.g., why isn't a particular work unit progressing), informational data to educate a user, and/or the like. A software development insight component may be rendered to a software development insight interface based on data and instructions provided by a multi-resource software development and insight system (e.g., software development and insight server computing device). In some embodiments, such data and instructions are facilitated by a dedicated software application running on the client device. In other embodiments, such data and instructions are provided through a web browser running on the client device. In some embodiments, software development insight components are generated based on data-driven inferences facilitated by a software development work graph, such as a multi-resource software development work graph structure.

The term "multi-resource software development work graph structure" refers to a data structure configured to represent relationships among resource objects associated with one or more development units. In an example embodiment, a multi-resource software development work graph structure is configured to at least represent relationships among a code pull request set generated by a code execution and revision control resource and an issue object set generated by a code development planning resource. A multi-resource software development work graph structure may reflect, surface, or otherwise highlight various relationships among the code pull request set and the issue object set, as well as relationships among other resources objects (e.g., code repositories, etc.) associated with the code pull request set and/or issue object set. For example, the multi-resource software development work graph structure may surface/highlight dependency relationships among the code pull request set and the issue object set.

A multi-resource software development work graph structure may comprise nodes and edges, wherein a given node represents a particular resource object and may be connected to another node by an edge. For example, in an example embodiment where a multi-resource software development work graph structure is configured to at least represent relationships among a code pull request set and an issue object set, the multi-resource software development work graph structure may comprise a set of code pull request nodes and a set of issue object nodes (e.g., a plurality of code pull request nodes and a plurality of issue object nodes), wherein each code pull request node represents a particular code pull request in the code pull request set, and each issue object node in the set of issue object nodes represent a particular issue object in the issue object set. It should be understood, however, that in some embodiments, additionally or alternatively, a multi-resource software development work graph structure may be configured to represent relationships among other resource objects. In some embodiments, a graphical representation of the multi-resource software development work graph structure can be, at least partially, rendered via a graphical user interface.

The term "multi-resource software development work graph structure node," "resource object nodes," "node," or the like may be used interchangeably to refer to a node or vertex of a multi-resource software development work graph structure. The multi-resource software development work graph structure node is representative of a resource object, such as a code pull request, an issue, a commit, a merge, and/or the like.

The term "multi-resource software development work graph structure edge," "resource object relationship edge," "edge," or the like may be used interchangeably to refer to a representation of a relationship between a pair of resource objects (e.g., a pair of code pull requests, a pair of issue objects, a pair of code pull request and issue object, a pair of projects, a pair of repositories, a pair of projects and repositories, and/or the like), each represented by a multi-resource software development work graph structure node. In some embodiments, the multi-resource software development work graph structure edge may be represented by one or more lines, links, arrows, the like, or combinations thereof.

The terms "data," "content," "digital content," "digital content object," "signal," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be transmitted directly to another computing device or may be transmitted indirectly via one or more intermediary computing devices, such as, for example, one or more servers, relays, routers, network access points, base stations, hosts, and/or the like.

The term "computer-readable storage medium" refers to a non-transitory, physical or tangible storage medium (e.g., volatile or non-volatile memory), which may be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical, infrared waves, or the like. Signals include man-made, or naturally occurring, transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

The terms "client device," "computing device," "network device," "computer," "user equipment," and similar terms may be used interchangeably to refer to a computer comprising at least one processor and at least one memory. In some embodiments, the client device may further comprise one or more of a display device for rendering one or more of a graphical user interface (GUI), a vibration motor for a haptic output, a speaker for an audible output, a mouse, a keyboard or touch screen, a global position system (GPS) transmitter and receiver, a radio transmitter and receiver, a microphone, a camera, a biometric scanner (e.g., a fingerprint scanner, an eye scanner, a facial scanner, etc.), or the like. Additionally, the term "client device" may refer to computer hardware and/or software that is configured to access a service made available by a server. The server is often, but not always, on another computer system, in which case the client accesses the service by way of a network. Embodiments of client devices may include, without limitation, smartphones, tablet computers, laptop computers, personal computers, desktop computers, enterprise computers, and the like. Further non-limiting examples include wearable wireless devices such as those integrated within watches or smartwatches, eyewear, helmets, hats, clothing, earpieces with wireless connectivity, jewelry and so on, universal serial bus (USB) sticks with wireless capabilities, modem data cards, machine type devices or any combinations of these or the like.

The term "circuitry" may refer to: hardware-only circuit implementations (e.g., implementations in analog circuitry and/or digital circuitry); combinations of circuits and one or more computer program products that comprise software and/or firmware instructions stored on one or more computer readable memory devices that work together to cause an apparatus to perform one or more functions described herein; or integrated circuits, for example, a processor, a plurality of processors, a portion of a single processor, a multicore processor, that requires software or firmware for operation even if the software or firmware is not physically present. This definition of "circuitry" applies to all uses of this term herein, including in any claims. Additionally, the term "circuitry" may refer to purpose built circuits fixed to one or more circuit boards, for example, a baseband integrated circuit, a cellular network device or other connectivity device (e.g., Wi-Fi card, Bluetooth circuit, etc.), a sound card, a video card, a motherboard, and/or other computing device.

The terms "application," "software application," "app," "product," "service" or similar terms refer to a computer program or group of computer programs designed to perform coordinated functions, tasks, or activities for the benefit of a user or group of users. A software application can run on a server or group of servers (e.g., a physical or virtual servers in a cloud-based computing environment). In certain embodiments, an application is designed for use by and interaction with one or more local, networked or remote computing devices, such as, but not limited to, client devices. Non-limiting examples of an application comprise project management, workflow engines, service desk incident management, team collaboration suites, cloud services, word processors, spreadsheets, accounting applications, web browsers, email clients, media players, file viewers, videogames, audio-video conferencing, and photo/video editors. In some embodiments, an application is a cloud product.

Example System Architecture

FIG. 1 illustrates an example system architecture 100 within which embodiments of the present disclosure may operate. The architecture 100 includes a multi-resource software development and insight system 103 configured to interact with one or more resources 104A-104N. Such resources may include a code development planning resource 104A (e.g., Jira® by Atlassian), a code execution and revision control resource 104B (e.g., GitHub), and/or other resources configured to facilitate code development-related activities. As further depicted in FIG. 1, the multi-resource software development and insight system 103 may be configured to interact with one or more client devices 101A-101N. The multi-resource software development and insight system 103 may be configured to detect and/or receive a software development context object from the client devices 101A-101N, determine one or more insight components based on the software development context object, and output the one or more insight components for rendering to a software development insight interface.

The multi-resource software development and insight system 103 may comprise a software development and insight server computing device 106 in communication with a storage subsystem 108. Such storage subsystem 108 may be hosted by the software development and insight server computing device 106 or otherwise hosted by devices in communication with the software development and insight server computing device 106. In some embodiments, storage subsystem 108 may comprise a separate system external to the multi-resource software development and insight system 103.

Software development and insight server computing device 106 may include circuitry, networked processors, or the like configured to perform some or all of the software development and insight server-based processes described herein, and may be any suitable network server and/or other type of processing device. In some embodiments, software development and insight server computing device 106 may determine and transmit commands and instructions for rendering software development insight component(s) to a software development insight interface in response to receipt of a software development context object. In this regard, the software development and insight server computing device 106 may be embodied by any of a variety of devices, for example, the software development and insight server computing device 106 may be embodied as a computer or a plurality of computers. For example, software development and insight server computing device 106 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals.

Example embodiments contemplated herein may have various form factors and designs but will nevertheless include at least the components illustrated in FIG. 2 and described in connection therewith. In some embodiments, software development and insight server computing device 106 may be located remotely from the storage subsystem 108, although in other embodiments, the software development and insight server computing device 106 may comprise the storage subsystem 108. The software development and insight server computing device 106 may, in some embodiments, comprise several servers or computing devices performing interconnected and/or distributed functions. Despite the many arrangements contemplated herein, software development and insight server computing device 106 is shown and described herein as a single computing device to avoid unnecessarily overcomplicating the disclosure.

Software development and insight server computing device 106 can communicate with one or more resources 104A-104N (e.g., code development planning resource, code execution and revision control resource, etc.) via one or more networks, such communications network 102. Additionally, software development and insight server computing device 106 can communicate with one or more client devices 101A-101N via the one or more networks (e.g., communications network 102). Communications network 102 may include any one or more wired and/or wireless communication networks including, for example, a wired or wireless local area network (LAN), personal area network (PAN), metropolitan area network (MAN), wide area network (WAN), or the like, as well as any hardware, software and/or firmware required for implementing the one or more networks (e.g., network routers, switches, hubs, etc.). For example, communications network 102 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the communications network 102 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the multi-resource software development and insight system 103.

Storage subsystem 108 may be stored by any suitable storage device configured to store some or all of the information described herein (e.g., memory of the software development and insight server computing device 106 or a separate memory system separate from the software development and insight server computing device 106, such as one or more database systems, backend data servers, network databases, cloud storage devices, or the like provided by another device (e.g., online application or 3rd party provider), such as a Network Attached Storage (NAS) device or devices, or as a separate database server or servers. Storage subsystem 108 may comprise data received from the software development and insight server computing device 106 (e.g., via a memory 201 and/or processor(s) 202), and the corresponding storage device may thus store this data. Storage subsystem 108 includes information accessed and stored by the software development and insight server computing device 106 to facilitate generation of a multi-resource software development work graph structure, software development insight components, and/or other operations of the multi-resource software development and insight system 103. As such, Storage subsystem 108 may include, for example, without limitation, code pull request identifier(s), issue object identifier(s), resource identifier(s), resource provider identifier(s), user identifiers, team member identifiers, team identifiers, project identifiers, team member data, team workload value (e.g., a team's total current workload), team member workload value (e.g., a team member's total current workload across all projects/teams), team member skillset value, team member experience value (e.g., years of experience), team member performance data, development unit identifiers, development unit event identifiers, past development unit performance data, development unit commit data, development unit event data, source code files, timestamps (e.g., code pull request timestamps, code pull request approval time stamp, code merge timestamp, etc.) and/or the like.

The client devices 101A-101N may be implemented as any computing device as defined above. Electronic data received by the software development and insight server computing device 106 from the client devices 101A-101N may be provided in various forms and via various methods. For example, the client devices 101A-101N may include desktop computers, laptop computers, smartphones, netbooks, tablet computers, wearables, and/or other networked device, which may be used for any suitable purpose in addition to presenting a software development insight interface to a user and otherwise providing access to the multi-resource software development and insight system 103. The depiction in FIG. 1 of "N" client devices is merely for illustration purposes. According to some embodiments, the client devices 101A-101N may be configured to display an interface on a display of the client device for viewing, creating, editing, and/or otherwise interacting with at least one user interface, which may be provided by the multi-resource software development and insight system 103.

In embodiments where a client device 101A-101N is a mobile device, such as a smartphone or tablet, the client device 101A-101N may execute an "app" to interact with the multi-resource software development and insight system 103. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. The mobile operating systems named above each provide frameworks for interacting with, for example, wired and wireless network interfaces, user contacts, and other applications. Communication with hardware and software modules executing outside of the app is typically provided via application programming interfaces (APIs) provided by the mobile device operating system. Additionally, or alternatively, the client device 101A-101N may interact with the multi-resource software development and insight system 103 via a web browser. As yet another example, the client devices 101A-101N may include various hardware or firmware designed to interface with the multi-resource software development and insight system 103.

Example Apparatus for Implementing Embodiments of the Present Disclosure

The software development and insight server computing device 106 may be embodied by one or more computing systems, such as apparatus 200 shown in FIG. 2. In accordance with some example embodiments, the apparatus 200 may include various means, such as memory 201, processor 202, input/output circuitry 203, communications circuitry 204, software development work graph circuitry 205, and/or software development insight circuitry 206. The apparatus 200 may be configured to execute the operations described herein. For example, one or more of components 201-206 may be configured to facilitate the functionality discussed herein regarding generating software development insight component(s) and/or associated operations. For example, the software development work graph circuitry 205 and/or software development insight circuitry 206 may be configured to receive software development context object(s), determine one or more software development insight components based at least in part on a multi-resource software development work graph structure, and output the one or more software development insight components for rending to one or more client devices 101A-101N (e.g., via a software development insight interface). As another example, the software development work graph circuitry 205 and/or software development insight circuitry 206 may be configured to generate and/or update multi-resource software development work graph structure(s). As yet another example, the software development work graph circuitry 205 and/or software development insight circuitry 206 may be configured to generate, train, and/or re-train one or more models, such as insight prediction machine learning model(s). Although these components 201-206 are described with respect to functional limitations, it should be understood that the particular implementations necessarily include the use of particular hardware. It should also be understood that certain of these components 201-206 may include similar or common hardware. For example, two sets of circuitries may both leverage use of the same processor, network interface, storage medium, or the like to perform their associated functions, such that duplicate hardware is not required for each set of circuitries.

Although the use of the term "circuitry" as used herein with respect to components 201-206 are described in some cases with respect to functional limitations, it should be understood that the particular implementations necessarily include the use of particular hardware configured to perform the functions associated with the respective circuitry as described herein. It should also be understood that certain of these components 201-206 may include similar or common hardware. For example, two sets of circuitry may both leverage use of the same processor, network interface, storage medium, or the like to perform their associated functions, such that duplicate hardware is not required for each set of circuitry.

The term "circuitry" should also be understood, in some embodiments, to include software for configuring the hardware. For example, in some embodiments, "circuitry" may include processing circuitry, storage media, network interfaces, input/output devices, and the like. In some embodiments, other elements of the software development and insight server computing device 106 may provide or supplement the functionality of particular circuitry. For example, the processor 202 may provide processing functionality, the memory 201 may provide storage functionality, the communications circuitry 204 may provide network interface functionality, and the like.

In some embodiments, the processor 202 (and/or co-processor or any other processing circuitry assisting or otherwise associated with the processor) may be in communication with the memory 201 via a bus for passing information among components of, for example, software development and insight server computing device 106. The memory 201 is non-transitory and may include, for example, one or more volatile and/or non-volatile memories, or some combination thereof. In other words, for example, the memory 201 may be an electronic storage device (e.g., a computer readable storage medium). The memory 201 may be configured to store information, data, content, applications, instructions, or the like, for enabling an apparatus, e.g., software development and insight server computing device 106 to carry out various functions in accordance with example embodiments of the present disclosure.

Although illustrated in FIG. 2 as a single memory, memory 201 may comprise a plurality of memory components. The plurality of memory components may be embodied on a single computing device or distributed across a plurality of computing devices. In various embodiments, memory 201 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 201 may be configured to store information, data, applications, instructions, or the like for enabling apparatus 200 to carry out various functions in accordance with example embodiments discussed herein. For example, in at least some embodiments, memory 201 is configured to buffer data for processing by processor 202. Additionally or alternatively, in at least some embodiments, memory 201 is configured to store program instructions for execution by processor 202. Memory 201 may store information in the form of static and/or dynamic information. This stored information may be stored and/or used by apparatus 200 during the course of performing its functionalities.

Processor 202 may be embodied in a number of different ways and may, for example, include one or more processing devices configured to perform independently. Additionally or alternatively, processor 202 may include one or more processors configured in tandem via a bus to enable independent execution of instructions, pipelining, and/or multithreading. Processor 202 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. The use of the term "processing circuitry" may be understood to include a single core processor, a multi-core processor, multiple processors internal to the apparatus, and/or remote or "cloud" processors. Accordingly, although illustrated in FIG. 2 as a single processor, in some embodiments, processor 202 comprises a plurality of processors. The plurality of processors may be embodied on a single computing device or may be distributed across a plurality of such devices collectively configured to function as apparatus 200 (e.g., software development and insight server computing device 106). The plurality of processors may be in operative communication with each other and may be collectively configured to perform one or more functionalities of apparatus as described herein.

In an example embodiment, processor 202 is configured to execute instructions stored in the memory 201 or otherwise accessible to processor 202. Alternatively or additionally, the processor 202 may be configured to execute hardcoded functionality. As such, whether configured by hardware or software methods, or by a combination thereof, the processor 202 may represent an entity (e.g., physically embodied in circuitry) capable of performing operations according to an embodiment of the present disclosure while configured accordingly. Alternatively, as another example, when the processor 202 is embodied as an executor of software instructions, the instructions may specifically configure processor 202 to perform one or more algorithms and/or operations described herein when the instructions are executed. For example, these instructions, when executed by processor 202, may cause software development and insight server computing device 106 to perform one or more of the functionalities of software development and insight server computing device 106 as described herein.

In some embodiments, input/output circuitry 203 may, in turn, be in communication with processor 202 to provide an audible, visual, mechanical, or other output and/or, in some embodiments, to receive an indication of an input. In that sense, input/output circuitry 203 may include means for performing analog-to-digital and/or digital-to-analog data conversions. Input/output circuitry 203 may include support, for example, for a display, touchscreen, keyboard, button, click wheel, mouse, joystick, an image capturing device (e.g., a camera), motion sensor (e.g., accelerometer and/or gyroscope), microphone, audio recorder, speaker, biometric scanner, and/or other input/output mechanisms. Input/output circuitry 203 may comprise a user interface (e.g., a project management user interface, a software development insight interface, etc.) and may comprise a web user interface, a mobile application, a kiosk, or the like. The processor 202 and/or user interface circuitry comprising the processor 202 may be configured to control one or more functions of a display or one or more user interface elements through computer program instructions (e.g., software and/or firmware) stored on a memory accessible to the processor 202 (e.g., memory 201, and/or the like). In embodiments where apparatus 200 may be implemented as a software development and insight server computing device 106, as shown in FIG. 2, aspects of input/output circuitry 203 may be reduced as compared to embodiments where apparatus 200 may be implemented as an end-user machine or other type of device designed for complex user interactions (i.e., client device 101A). In some embodiments (like other components discussed herein), input/output circuitry 203 may even be eliminated from apparatus 200. Input/output circuitry 203 may be in communication with memory 201, communications circuitry 204, and/or any other component(s), such as via a bus. Although more than one input/output circuitry and/or other component can be included, only one is shown in FIG. 2 to avoid overcomplicating the disclosure (e.g., like the other components discussed herein).

Communications circuitry 204 may be any means such as a device or circuitry embodied in either hardware or a combination of hardware and software that is configured to receive and/or transmit data from/to a network and/or any other device, circuitry, or module in communication with apparatus 200. In this regard, the communications circuitry 204 may include, for example, a network interface for enabling communications with a wired or wireless communication network. Communications circuitry 204 may be configured to receive and/or transmit any data that may be stored by memory 201 using any protocol that may be used for communications between computing devices. For example, the communications circuitry 204 may include one or more network interface cards, antennae, transmitters, receivers, buses, switches, routers, modems, and supporting hardware and/or software, and/or firmware/software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols. Communications circuitry 204 may additionally or alternatively be in communication with the memory 201, input/output circuitry 203 and/or any other component of apparatus 200, such as via a bus.

Software development work graph circuitry 205 may be configured to perform the functionality discussed herein related to providing software development insight component(s). For example, software development work graph circuitry 205 includes hardware components and/or software configured to support software development insight generation-related functionality, features, and/or services of the apparatus 200. In some embodiments, software development work graph circuitry 205 includes hardware components and/or software configured to generate, store, and/or update multi-resource software development work graph structure(s). In some embodiments, software development work graph circuitry 205 may be configured to generate, store, and/or update a single multi-resource software development work graph structure. In some other embodiments, software development work graph circuitry 205 may be configured to generate, store, and/or update multiple multi-resource software development work graph structures.

In some embodiments, to generate a multi-resource software development work graph structure, software development work graph circuitry 205 receives resource data from multiple resources 104A-104N and generates one or more multi-resource software development work graph structure based on the received resource data. In some embodiments, such resource data may include one or more of code pull request identifier(s), issue object identifier(s), resource identifier(s), resource provider identifier(s), user identifier(s), team identifier(s), team member identifier(s), development unit identifier(s), customer identifier(s), code repository identifier, branch identifier, code pull request status, issue object status, development unit status, team member past performance metric data, development unit performance metric data, and/or the like. It should be understood that the received resource data may include any data associated with a resource (e.g., code development planning resource, code execution and revision control resource, etc.) and/or associated data that may be configured for generating a multi-resource software development work graph structure. Additionally, in some embodiments, to generate and/or update a multi-resource software development work graph structure, software development work graph circuitry 205 may process the received resource data to determine associations and/or relationships (e.g., relationship data) with respect to the resource data, and generate the multi-resource software development work graph structure based at least in part on the associations and/or relationships (e.g., relationship data). In some embodiments, software development work graph circuitry 205 may determine the associations and/or relationships using a machine learning model. In some embodiments, software development work graph circuitry 205 may store the received resource data and/or generated multi-resource software development work graph structure(s), for example, in storage subsystem 108. As such, in some embodiments, the software development work graph circuitry 205 may include hardware components and/or software configured to send and/or receive data from storage sub-system 108.

In some embodiments, software development work graph circuitry 205 updates a multi-resource software development work graph structure in response to one or more software development events (e.g., branch creation events, commit events, code pull request events, code pull request approval events, code pull request merge events, issue object generation events, issue status change, etc.). As such, in some embodiments, software development work graph circuitry 205 may include hardware components and/or software configured to detect and/or receive software development event(s). In some embodiments, software development work graph circuitry 205 may optimize a software development work graph structure. In some embodiments, to optimize a software development work graph structure, software development work graph circuitry 205 may generate implicit associations and/or relationships with respect to the received resource data, and update the software development work graph structure based on the implicit associations and/or relationships. In some embodiments, software development work graph circuitry 205 may generate the implicit associations and/or relationships using a machine learning model.

The software development work graph circuitry 205 may utilize processing circuitry, such as the processor 202, to perform its corresponding operations, and may utilize memory 201 to store collected information. It should also be appreciated that, in some embodiments, the software development work graph circuitry 205 may include a separate processor, specially configured field programmable gate array (FPGA), or application specific interface circuit (ASIC) to perform its corresponding functions. For example, in some embodiments, some or all of the functionality of software development work graph circuitry 205 may be performed by processor 202. In this regard, some or all of the example processes and algorithms discussed herein can be performed by at least one processor 202 and/or software development work graph circuitry 205. For example, non-transitory computer readable storage media can be configured to store firmware, one or more application programs, and/or other software, which include instructions and other computer-readable program code portions that can be executed to control processors of the components of apparatus 200 to implement various operations, including the examples shown herein. As such, a series of computer-readable program code portions may be embodied in one or more computer program products and can be used, with a device, apparatus 200, database, and/or other programmable apparatus, to produce the machine-implemented processes discussed herein. It is also noted that all or some of the information discussed herein can be based on data that is received, generated and/or maintained by one or more components of the apparatus 200. In some embodiments, one or more external systems (such as a remote cloud computing and/or data storage system) may also be leveraged to provide at least some of the functionality discussed herein.

Software development insight circuitry 206 may be configured to perform the functionality discussed herein related to providing software development insight component(s). For example, software development insight circuitry 206 includes hardware components and/or software configured to support software development insight generation-related functionality, features, and/or services of the apparatus 200. In some embodiments, software development insight circuitry 206 includes hardware components and/or software configured to retrieve a multi-resource software development work graph structure from a repository, for example, storage sub-system 108.

In some embodiments, software development insight circuitry 206 includes hardware components and/or software configured to receive a software development context object and determine one or more software development insight components based at least in part on the software development context object. In some embodiments, to determine the one or more software development insight components, software development insight circuitry 206 traverses the retrieved multi-resource software development work graph structure based on the software development context object. In some embodiments, software development insight circuitry 206 may generate one or more inferences based at least in part on traversing the retrieved multi-resource software development work graph structure, and determine the one or more software development insight components based at least in part on the one or more inferences. As such, in some embodiments, the software development insight circuitry 206 includes hardware components and/or software configured to generate one or more inferences based at least in part on traversing a multi-resource software development work graph structure.

In some embodiments, software development insight circuitry 206 includes hardware components and/or software configured to support a machine learning model to provide software development insight-related functionality, features, and/or services of the apparatus 200. The machine learning model (e.g., insight prediction machine learning model) may be configured to generate one or more software development insight components based on one or more multi-resource software development work graph structures. In some embodiments, the machine learning model (e.g., insight prediction machine learning model) may be configured to receive input data, generate one or more inferences based on the input data, and determine one or more software development insight components based on the input data. In some embodiments, the input data may include at least a software development context object. Additionally or alternatively, in some embodiments, a multi-resource software development work graph structure may comprise input to the machine learning model. In some embodiments, the machine learning model may be configured to traverse the multi-resource software development work graph structure based on the software development context object in order to generate the one or more inferences, which in turn, are used to determine contextually relevant software development insight component(s). In some embodiments, the machine learning model may be trained using training data that includes historical resource data received from a plurality of resources 104A-104N. For example, in some embodiments, the machine learning model may be trained using one or more historical multi-resource software development work graph structures and/or associated data. In some embodiments, software development insight circuitry 206 includes hardware components and/or software configured to train the machine learning model, as described above. In some embodiments, software development insight circuitry 206 includes hardware components and/or software configured to re-train the machine learning model (e.g., insight prediction machine learning model) based on updated multi-resource software development work graph structure(s). In some embodiments, the software development insight circuitry 206 is configured to identify one or more software development events, and update a multi-resource software development work graph structure based on the one or more software development events. In some embodiments, the one or more software development events are associated with one or more of un-graphed issue object set(s), un-graphed code pull request(s), and/or other un-graphed resource objects. For example, in some embodiments, the one or more software development events are associated with at least one un-graphed issue object set. As another example, in some embodiments, the one or more software development events are associated with at least one un-graphed code pull request. As yet another example, the one or more software development events are associated with at least one un-graphed code pull request and at least one un-graphed issue object.

The software development insight circuitry 206 may utilize processing circuitry, such as the processor 202, to perform its corresponding operations, and may utilize memory 201 to store collected information. The software development insight circuitry 206 may send and/or receive data from storage subsystem 108, wherein such data may include resource data associated with multiple resources 104A-104N, data associated with a multi-resource software development work graph structure, and/or other data. In some embodiments, the sent and/or received data may include one or more of multi-resource software development work graph structure(s), code pull request identifier(s), pull request status identifier(s) issue object identifier(s), issue object status identifier(s), resource identifier(s), resource provider identifier(s), user identifier, team identifier, team member identifier, development unit identifier, project identifier, resource identifier, customer identifier, pull request progress data, issue object status, issue object progress data, development unit past performance data, team member past performance data, and/or the like.

It should also be appreciated that, in some embodiments, the software development insight circuitry 206 may include a separate processor, specially configured field programmable gate array (FPGA), or application specific interface circuit (ASIC) to perform its corresponding functions. For example, in some embodiments, some or all of the functionality of software development insight circuitry 206 may be performed by processor 202. In this regard, some or all of the example processes and algorithms discussed herein can be performed by at least one processor 202 and/or software development insight circuitry 206. For example, non-transitory computer readable storage media can be configured to store firmware, one or more application programs, and/or other software, which include instructions and other computer-readable program code portions that can be executed to control processors of the components of apparatus 200 to implement various operations, including the examples shown herein. As such, a series of computer-readable program code portions may be embodied in one or more computer program products and can be used, with a device, software development and insight server computing device 106, database, and/or other programmable apparatus, to produce the machine-implemented processes discussed herein. It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present disclosure may be configured as systems, methods, apparatuses, computing devices, personal computers, servers, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions embodied in the computer-readable storage medium (e.g., computer software stored on a hardware device). Any suitable computer-readable storage medium may be utilized including non-transitory hard disks, CD-ROMs, flash memory, optical storage devices, or magnetic storage devices.

As will be appreciated, any such computer program instructions and/or other type of code may be loaded onto a computer, processor or other programmable apparatus's circuitry to produce a machine, such that the computer, processor, or other programmable circuitry that execute the code on the machine creates the means for implementing various functions, including those described herein in connection with the components of apparatus 200.

The computing systems described herein can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server. In various embodiments of the present disclosure, an apparatus (e.g., software development and insight server computing device 106) is configured to output one or more contextually relevant software development insight components for rendering to a software development insight interface associated with a multi-resource software development and insight system 103.

Referring now to FIG. 3, an example multi-resource software development work graph structure is illustrated. In some embodiments, a multi-resource software development work graph structure may be generated by a computing device (e.g., software development work graph circuitry 205) such that the multi-resource software development work graph structure comprises a plurality of multi-resource software development work graph structure nodes, each representing a resource (e.g., code pull request, issue object, code repository, and/or the like) associated with one or more development units. A multi-resource software development work graph structure may represent relationships among various entities associated with software development. In some embodiments, a multi-resource software development work graph structure is configured to at least represent relationships among a code pull request set and an issue object set that are each associated with a particular development unit. For example, in some embodiments each code pull request associated with a development unit may be represented by a node of the multi-resource software development work graph structure (e.g., code pull request node), and each issue object associated with the development unit may be represented by a node of the multi-resource software development work graph structure (an issue object node). Additionally or alternatively, in some embodiments, other resources associated with the code pull request set and the issue object set may be represented by a node of the multi-resource development work graph structure. It would be appreciated, however, that in various embodiments, a multi-resource work graph structure is not limited to representing relationships between code pull requests and issues objects. For example, in some embodiments, additionally or alternatively, a multi-resource development work graph is configured to at least represent container relationships (e.g., relationships between projects and repositories).

As depicted in FIG. 3, a multi-resource software development work graph structure 300 may comprise one or more edges, each connecting a pair of multi-resource software development work graph structure nodes, and representing a relationship between the pair of nodes. For example, multi-resource software development work graph structure node 302A, that represents a first issue object, is depicted as being dependently connected to multi-resource software development work graph structure node 302B, that represents a second issue object, by way of an edge 301. As another example, multi-resource software development work graph structure node 304A, that represents a first pull request, is depicted as being connected to multi-resource software development work graph structure node 306A, that represents a first code repository, by way of an edge 302. In some embodiments, the multi-resource software development work graph structure 300 can comprise a weighted graph. For example, each edge of the multi-resource software development work graph structure 300 may be assigned one or more edge weights, wherein an edge weight may represent a degree or significance of relationship between two nodes connected by the edge. In some embodiments, an edge weight encodes a relative importance of the connected nodes with respect to the associated development unit(s) and/or with respect to generating software development insight(s). In some embodiments, a multi-resource software development work graph structure may be traversed based on the edge weights. In some embodiments, edge weights may be assigned based at least in part on dependency relationship data, where an edge weight may correspond to the type and/or level of dependency.

As illustrated in FIG. 3, an issue object E, represented by multi-resource software development work graph structure node 302E is dependent on a plurality of other issue objects A-D, represented by multi-resource software development work graph structure nodes 302A-D. For example, issue object E is directly dependent on issue objects B-C. Additionally issue object E is transitively dependent on all issue objects that issue objects B-C are directly or transitively dependent upon. Further issue object E is dependent on each code pull request associated with issue objects B-C. It should be appreciated that a multi-resource software development work graph structure edge is not limited to representing dependency relationships. For example, in some embodiments, additionally or alternatively, the multi-resource software development work graph structure edge represents container relationships (e.g., relationship between a project and a repository). It should also be appreciated that as software development events associated with a multi-resource software development work graph structure (e.g., software development events associated with the one or more development units associated with the multi-resource software development work graph structure) occur, the multi-resource software development work graph structure may change in appearance accordingly. For example, in response to additional code pull request events, issue generation events, merge events, and/or the like, additional nodes and/or edges may be represented in the multi-resource software development work graph structure or removed from the multi-resource software development work graph structure.

FIG. 4 illustrates example software development insight component(s) 404 structured in accordance with various embodiments of the subject disclosure. In some embodiments, a software development insight component 404 may be configured to convey or otherwise reflect a recommendation, a suggested action, and/or other insights with respect to a development unit. As a non-limiting example, a software development insight component may comprise an actionable insight. Non-limiting examples of software development insight components include a recommendation to automate a task, a suggested action for solving a specific job/task, a recommendation (e.g., resource recommendation) to use a particular resource/tool, a bottleneck notification, a project completion delay notification, a non-compliance notification, a conversation, and/or the like. For example, a software development insight component may comprise data and/or features configured to help user(s) solve a specific job/task, help user(s) understand areas of a development unit to focus on to improve efficiency, cycle time, and/or other performance metrics associated with software development, help user(s) understand the status of work across a multi-resource software development environment, manage dependencies (e.g., task dependencies), help user(s) coordinate who picks up work, help user(s) manage unplanned work (e.g., generate work across the multi-resource software development environment based on software development insight components such as "bugs" that are identified across the various resources/tools in the multi-resource software environment/toolchain), help user(s) understand bottlenecks and identify opportunities for improvement, help streamline software development collaboration workflows such as automating across the multi-resource software development environment to facilitate the flow of work and keep resources/tools and/or their data aligned (e.g. in sync), and/or provide report on work progress.

In example embodiments, the apparatus 200 is configured to generate one or more software development insight components 404 and output such one or more software development insight components for rendering to a software development insight interface 402. The one or more software development insight components 404 may be outputted for rendering to a software development insight interface 402 in association with the planning of a development unit (e.g., project, sprint, story, epic, initiative, and/or the like) in an iterative multi-resource software development environment. Additionally or alternatively, the one or more software development insight components may be outputted for rendering to a software development insight interface 402 in association with an active development unit (e.g., existing sprint, story, epic, initiative, and/or the like).

In example embodiments, the software development insight interface 402 may be rendered to a client device 101A-101N. For example, in some embodiments, software development insight interface 402 may be rendered to an interface associated with one or more resources (e.g., a code development planning resource, a code execution and revision control resource, etc.) The software development insight interface 402 may, for example, be rendered to a backlog view user interface, an issue view user interface, a message view user interface, a board view project, and/or the like associated with a code development planning resource.

In some embodiments, the apparatus 200 generates and outputs software development insight component(s) 404 for rendering to a software development insight interface 402 in response to detecting and/or receiving a software development context object. In some embodiments, a software development context object is configured to trigger generation and/or outputting of one or more software development insight components. In some embodiments, a software development context object may be generated based at least in part on user interaction with a client device 101A. For example, in some embodiments, a user (e.g., planning user, manager user, team member, and/or the like) may trigger generation of a software development context object by verbal command, gesture, on-screen dynamics (e.g., soft key), or other user interaction with the client device.

For example, the user may provide user input (e.g., Why is this project stuck, Where is the project bottleneck, etc.) via client device 101A, that cause the client device 101A to generate a software development context object reflecting the user input. As another example, the user may interact with, for example, a specific insight actuator button (e.g., "Show Insights, etc.) rendered on a visual display of the client device 101A that, when selected by the user, causes the client device 101A to generate a software development context object. For example, in response to the user clicking or activating the "Show Insights" actuator button displayed, the client device 101A generates a software development context object and transmits the software development context object to the software development and insight server computing device 106. In some embodiments, the user interacts with a create development unit actuator button (e.g., "Create Sprint", "Create Story", "Create Epic", "Create Initiative", and/or the like), wherein such user interaction generates a software development context object in association with a create development unit request (e.g., a create sprint request, create story request, create epic request, create initiative request, and/or the like). As such, in some embodiments, a user may cause the client device 101A to generate a software development context object and transmit the software development context object to the software development and insight server computing device 106. In some embodiments, the apparatus 200 may be configured to monitor a development unit, wherein a software development context object may be generated based at least in part on a detected condition. Such condition may include an unchanged resource object status over a threshold amount time, policy-related non-compliance, unused resources, number of open code pull requests, number of issue objects associated with a team, a bottleneck, and/or the like.

Additionally or alternatively, in some embodiments, the apparatus may be configured to monitor software development events associated with a development unit(s), wherein a software development context object may be generated based at least in part on certain detected events. As such, in some embodiments, the apparatus may generate a software development context object and transmit the software development context object to the apparatus 200 without user input/user interaction. It should be understood, however, that such examples as described herein are for purposes of illustration and not of limitation, and other suitable variations of facilitating the generation of software development context objects are also contemplated by this disclosure as will be apparent to one of ordinary skill in the art.

In some embodiments, the apparatus is configured to, in response to detection and/or receipt of the software development context object by the software development and insight server computing device 106, generate one or more software development insight components, and output the generated one or more software development insight components for rendering to a software development insight interface. In some embodiments the software development insight interface may be rendered on a client device (e.g., client devices 101A-101N). In some embodiments, software development insight components may be generated with respect to one or more development unit identifiers. For example, in some embodiments, a software development context object comprises one or more development unit identifiers (e.g., project identifier, sprint identifier, story identifier, epic identifier, initiative identifier, and/or the like), wherein a multi-resource software development work graph structure associated with the one or more development unit identifiers may be traversed to determine contextually relevant software development insight component(s).

Additionally or alternatively, in some embodiments, a software development context object may comprise context data, wherein the one or more software development insight components may be determined based at least in part on the context data. It would be appreciated that the software development context object may comprise any data items or identifiers that may be used to determine contextually software development insight component(s). Non-limiting examples of such data may include team identifier, team member identifier, customer identifier, resource identifier, sprint identifier, development unit type, source code identifier, code pull request identifier, issue object identifier, source branch identifier, destination branch identifier, code pull request status, issue object status, pull request and/or the like.

As noted above, in some embodiments, the apparatus 200 is configured to determine software development insight component(s) with respect to one or more development units based at least in part on associated multi-resource software development work graph structure 300. In some embodiments, in determining software development insight components, the apparatus (e.g., software development and insight server computing device 106) may draw from a range of data, including but not limited to resource data (e.g., as described above), data derived from resource data, data derived from a multi-resource software development work graph structure, and/or other data. For example, in some embodiments, to determine software development insight component(s), apparatus 200 accesses a multi-resource software development work graph structure associated with one or more development unit identifiers, and traverses the multi-resource software development work graph structure 300 to generate one or more data-driven inferences, that in turn are used to determine the software development insight component(s). In an example embodiment, the multi-resource software development work graph structure 300 is configured to at least represent relationships between a code pull request set and an issue object set, wherein each code pull request in the code pull request set is represented by a multi-resource software development work graph structure node, and each issue object in the issue object set is also represented by a multi-resource software development work graph structure node as described above in connection with FIG. 3.

In example embodiments, one or more of the data described herein can be used in connection with a trained machine learning model configured to generate software development insight component(s) based on a multi-resource software development work graph structure(s). In some embodiments, a machine learning model (e.g., insight prediction machine learning model) may be trained based on one or more multi-resource software development work graph structures to generate software development insight components. In some embodiments, the trained machine learning model may be configured to receive one or more software development context objects as input, and generate one or more software development insight components based on the one or more development context objects. Additionally or alternatively, in some embodiments, the trained machine learning model may be configured to generate one or more inferences based on traversing a multi-resource software development work graph structure, and generate one or more software development insight components based at least in part on the one or more inferences. In some embodiments, the apparatus implements an unsupervised learning structure, a supervised learning structure, a reinforcement learning structure, a neural network structure, a deep learning structure, and/or the like for programmatically generating inferences with respect to the development unit and/or generating one or more software development insight components. In some embodiments, the machine learning model may be trained using training data that includes one or more multi-resource software development work graph structures and/or associated data. For example, in some embodiments, the machine learning model utilized by the apparatus 200 may be trained using at least one multi-resource software development work graph structure. In some embodiments, the machine learning model utilized by the apparatus 200 may be trained using data derived, or otherwise obtained from at least one multi-resource software development work graph structure, such as relationship data, past development unit performance data, team member data, code pull request timestamp, duration between a code pull request and associated code merging process, and/or the like.

Example Operations Performed

Having described the apparatus, system, and exemplary circuitry comprising embodiments of the present disclosure, it should be understood that the apparatus may proceed to output contextually relevant software development insight component(s) in a multi-resource software development and insight system 103 in a number of ways.

FIG. 5 is a flowchart illustrating a series of operations or process blocks that are executed or performed to generate a multi-resource software development work graph structure in accordance with some example embodiments of the present disclosure. The operations illustrated in FIG. 5 may, for example, be performed by, with the assistance of, and/or under the control of an apparatus (e.g., software development and insight server computing device 106), as described above. In this regard, performance of the operations may invoke one or more of memory 201, processor 202, input/output circuitry 203, communications circuitry 204, software development work graph circuitry 205, and/or software development insight circuitry 206.

In the embodiment illustrated in FIG. 5, the flowchart illustrates method 500 which includes identifying a plurality of resource objects at Block 502. For example, the software development and insight server computing device 106 may include means, such as the processor 202, communications circuitry 204, software development work graph circuitry 205, software development insight circuitry 206, or the like, for identifying a plurality of resource objects. In some embodiments, the plurality of resource objects are associated with one or more development unit identifiers. In some embodiments, the plurality of resource objects include at least one code request set and at least one issue object set. In some embodiments, each resource object is associated with resource data. In some embodiments, example resource data include code pull request identifier(s), issue object identifier(s), resource identifier(s), resource provider identifier(s), user identifier(s), team identifier(s), team member identifier(s), development unit identifier(s), customer identifier(s), code repository identifier, branch identifier, code pull request status, issue object status, development unit status, team member past performance metric data, development unit performance metric data, and/or the like. For example, a particular issue object may be associated with resource data that includes at least an issue object identifier for the issue object. As another example, a code pull request object may be associated with resource data that includes at least code pull request identifier for the particular code pull request. In some embodiments, each resource object of the plurality of resource objects is identified in response to one or more software development events. In some embodiments, the plurality of resource objects are retrieved from one or more resource object repositories. In some embodiments, a resource object repository may be configured to store resource objects (e.g., code pull requests, issue objects, and/or the like) associated with one or more development unit identifiers. For example, a resource object repository may be configured to store resource objects associated with a particular development unit identifier. As another example, a resource object repository may be configured to store resource objects associated with a plurality of development unit identifiers.

At Block 504, the software development and insight server computing device 106 may include means, such as the processor 202, communications circuitry 204, software development work graph circuitry 205, software development insight circuitry 206, or the like, for extracting one or more features for each resource object based on the resource data associated with the respective resource object.

At Block 506, in some embodiments, the software development and insight server computing device 106 includes means, such as the processor 202, input/output circuitry 203, communications circuitry 204, software development work graph circuitry 205, software development insight circuitry 206, or the like, to identify, for each resource object, a resource object relationship between the resource object and each other resource object of the plurality of resource objects based on the one or more features.

At Block 508, in some embodiments, the software development and insight server computing device 106 includes means, such as the processor 202, input/output circuitry 203, communications circuitry 204, software development work graph circuitry 205, software development insight circuitry 206, or the like, to generate, based on each resource object relationship for each resource object, a multi-resource software development work graph structure interrelating the plurality of resource objects. In some embodiments, the software development and insight server computing device 106 includes means, such as the processor 202, input/output circuitry 203, communications circuitry 204, software development work graph circuitry 205, software development insight circuitry 206, or the like, to generate an insight prediction machine learning model based on the multi-resource software development work graph structure. The insight prediction machine learning model may be configured to generate software insight development components based on the software development work graph structure. In some embodiments, the insight prediction machine learning model comprises one or more of a supervised machine learning model, unsupervised machine learning model, reinforced machine learning model, neural network, and/or the like. In some embodiments, the insight prediction machine learning model is trained based on a multi-resource software development work graph structure(s). In some embodiments, the insight prediction machine learning model may be re-trained in response to updates to the multi-resource software development work graph structure(s).

FIG. 6 is a flowchart illustrating a series of operations or process blocks that are executed or performed to train and/or update an insight prediction machine learning model in accordance with some example embodiments of the present disclosure. The operations illustrated in FIG. 6 may, for example, be performed by, with the assistance of, and/or under the control of an apparatus (e.g., software development and insight server computing device 106), as described above. In this regard, performance of the operations may invoke one or more of memory 201, processor 202, input/output circuitry 203, communications circuitry 204, software development work graph circuitry 205, and/or software development insight circuitry 206.

In the embodiment illustrated in FIG. 6, the flowchart illustrates method 600 which includes identifying a multi-resource software development work graph structure at Block 602. For example, the software development and insight server computing device 106 may include means, such as the processor 202, communications circuitry 204, software development work graph circuitry 205, software development insight circuitry 206, or the like, for identifying a multi-resource software development work graph structure representing relationships among a plurality of resource objects. In some embodiments, the plurality of resource objects includes at least one code pull request set and at least one issue object set that are associated with one or more development unit identifiers. It would be understood, however, that the plurality of resource objects may include other resource objects. Furthermore, it would be understood that in some embodiments, the plurality of resource objects may not include code pull requests and/or issue objects.

At Block 604, the software development and insight server computing device 106 may include means, such as the processor 202, communications circuitry 204, software development work graph circuitry 205, software development insight circuitry 206, or the like, for training, an insight prediction machine learning model based on the multi-resource software development work graph structure. In some embodiments, training the insight prediction machine learning model based on the multi-resource software development work graph structure includes identifying and/or aggregating training dataset based on data associated with the multi-resource software development work graph structure. For example, in some embodiments, the software development and insight server computing device 106 may include means, such as the processor 202, communications circuitry 204, software development work graph circuitry 205, software development insight circuitry 206, or the like for extracting data from the multi-resource software development work graph structure, and aggregating a training dataset based on the extracted data.

At Block 606, in some embodiments, the software development and insight server computing device 106 includes means, such as the processor 202, input/output circuitry 203, communications circuitry 204, software development work graph circuitry 205, software development insight circuitry 206, or the like, for re-training an insight prediction machine learning model. In some embodiments, an insight prediction machine learning model is re-trained based on an updated multi-resource software development work graph structure. In some embodiments, the software development and insight server computing device 106 includes means, such as the processor 202, input/output circuitry 203, communications circuitry 204, software development work graph circuitry 205, software development insight circuitry 206, or the like, for identifying one or more software development events (e.g., software development events associated with the one or more development unit identifiers associated with the multi-resource software development work graph structure), and updating the multi-resource software development work graph structure based on the one or more software development events. As an example, in some embodiments, the one or more software development events are associated with at least one un-graphed code pull request, and updating the multi-resource software development work graph structure comprises extracting one or more features from the at least one un-graphed code pull request. As another example, in some embodiments, the one or more software development events are associated with at least one un-graphed issue object set, and updating the multi-resource software development work graph structure comprises extracting one or more features from the at least one un-graphed issue object set. As yet another example, in some embodiments, the one or more software development events are associated with at least one un-graphed code pull request and at least one un-graphed issue object, and wherein updating the multi-resource software development work graph structure comprises extracting one or more features from the at least one un-graphed code pull request and the at least one un-graphed issue object. In some embodiments, the multi-resource software development work graph structure is updated based on the extracted one or more features.

FIG. 7 is a flowchart illustrating a series of operations or process blocks that are executed or performed to output contextually relevant software development insight component(s) in accordance with some example embodiments of the present disclosure. The operations illustrated in FIG. 7 may, for example, be performed by, with the assistance of, and/or under the control of an apparatus (e.g., software development and insight server computing device 106), as described above. In this regard, performance of the operations may invoke one or more of memory 201, processor 202, input/output circuitry 203, communications circuitry 204, software development work graph circuitry 205, and/or software development insight circuitry 206.

In the embodiment illustrated in FIG. 7, the flowchart illustrates method 700 which includes retrieving a multi-resource software development work graph structure associated with one or more development units at Block 702. For example, the software development and insight server computing device 106 may include means, such as the processor 202, communications circuitry 204, software development work graph circuitry 205, software development insight circuitry 206, or the like, for retrieving a multi-resource software development work graph structure associated with one or more development unit identifiers. In a non-limiting example, the development unit identified by the development unit identifier may comprise an active development unit identifier. In another non-limiting example, the development unit identified by the development unit identifier may comprise a development unit being newly created (e.g., by a planning user).

In some embodiments, the multi-resource software development work graph structure is retrieved in response to an event (e.g., work graph retrieval event) associated with the one or more development units. In a non-limiting example, the work graph retrieval event may comprise a code pull request event, wherein a multi-resource software development work graph structure associated with the development unit is retrieved in response to one or more code pull requests associated with the development unit. In another non-limiting example, the work graph retrieval event may comprise an issue object creation event, wherein a multi-resource software development work graph structure associated with the development unit is retrieved in response to creation of one or more issue objects. As yet another non-limiting example, a work graph retrieval event may comprise detection or receipt of a software development context object. As such in some embodiments, the multi-resource software development work graph structure may be retrieved in response to certain user interaction with the client device. For example in some embodiments, the apparatus may be configured to detect user interaction with a project management user interface, determine the development unit identifier based on the user interaction, and retrieve the multi-resource software development work graph structure based on the development unit identifier.

It should be understood, however, that the multi-resource software development work graph structure may be retrieved based on a range of work graph retrieval events determined to be qualified or otherwise configured to trigger retrieval of a multi-resource software development work graph structure. In some embodiments, the multi-resource software development work graph structure at least represents relationships among a code pull request set and an issue object set. Such relationships may include relationships between the code pull request set and issue object set, as well as relationships with and/or between other resources associated with the code pull request set and/or the issue object set. Such other resource for example may include code repositor(ies) associated with a code pull request, code pull request merge, sub-tasks associated with an issue object, and/or the like At Block 704, the software development and insight server computing device 106 may include means, such as the processor 202, communications circuitry 204, software development work graph circuitry 205, software development insight circuitry 206, or the like, for detecting and/or receiving a software development context object associated with the development unit. In some embodiments, the software development context object may be received from a client device. In some embodiments, a software development context object may comprise the development unit identifier, and/or other and/or data. For example, in some embodiments, the software development context object may comprise context data that provides context for determining contextually relevant software development insight components. For example, the software development context object may comprise data that describes a view of a user interface associated with a resource (e.g., code development planning resource), data that describes interface elements/components (e.g., "project status") of a user interface a user is interaction with, and/or the like.

At Block 706, in some embodiments, the software development and insight server computing device 106 includes means, such as the processor 202, input/output circuitry 203, communications circuitry 204, software development work graph circuitry 205, software development insight circuitry 206, or the like, to access the multi-resource software development work graph structure associated with the development unit identifier.

At Block 708, in some embodiments, the software development and insight server computing device 106 includes means, such as the processor 202, input/output circuitry 203, communications circuitry 204, software development work graph circuitry 205, software development insight circuitry 206, or the like, to traverse multi-resource software development work graph structure, based on the software development context object in order to determine one or more software development insight components. For example, software development and insight server computing device 106 may traverse the multi-resource software development work graph structure based on data obtained from the software development context object. In some embodiments, the software development and insight server computing device 106 may be configured to generate one or more inferences (e.g., erroneous projections, unforeseen bottlenecks, unplanned sprint, unused resources, and/or the like) based at least in part on traversing the multi-resource software development work graph structure. In some embodiments, the software development and insight server computing device 106 generates the one or more inferences using a machine learning model (e.g., insight prediction machine learning model). The machine learning model may be configured to traverse the multi-resource software development work graph structure to generate the one or more inferences, and determine the one or more software development insight components based on the one or more inferences. In some embodiments, the machine learning model (e.g., insight prediction machine learning model) may be trained to generate the one or more inferences based on the software development context object.

At Block 710, in some embodiments, the software development and insight server computing device 106 includes means, such as the processor 202, input/output circuitry 203, communications circuitry 204, software development work graph circuitry 205, software development insight circuitry

206, or the like, to output the one or more software development insight components for rendering to a software development insight interface. In some embodiments, the software development insight interface is rendered to a client device for display. For example, the software development insight interface may be rendered to a user interface associated with a resource (e.g., code development planning resource, code execution and revision control resource, and/or the like).

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

Thus, particular embodiments of the subject matter have been described. While this specification contains many specific implementation details, these should not be construed as limitations on the scope of any inventions or of what may be claimed, but rather as description of features specific to particular embodiments of particular inventions. Other embodiments are within the scope of the following claims. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. Any operational step shown in broken lines in one or more flow diagrams illustrated herein are optional for purposes of the depicted embodiment.

CONCLUSION

Many modifications and other embodiments of the present disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

Hereinafter, various characteristics will be highlighted in a set of numbered clauses or paragraphs. These characteristics are not to be interpreted as being limiting on the invention or inventive concept, but are provided merely as a highlighting of some characteristics as described herein, without suggesting a particular order of importance or relevancy of such characteristics.

Clause 1. An apparatus for outputting software development insight components to a software development insight interface, the apparatus comprising at least one processor, and at least one non-transitory memory including program code, the at least one non-transitory memory and the program code configured to, with the at least one processor, cause the apparatus to retrieve a multi-resource software development work graph structure associated with one or more development unit identifiers.

Clause 2. The apparatus of clause 1, wherein the multi-resource software development work graph structure is configured to represent relationships among a code pull request set and an issue object set that are associated with the one or more development unit identifiers.

Clause 3. The apparatus of any one of clauses 1-2, further caused to receive a software development context object associated with the one or more development unit identifiers.

Clause 4. The apparatus of any one of clauses 1-3, further caused to determine one or more software development insight components by traversing the multi-resource software development work graph structure based on the software development context object.

Clause 5. The apparatus of any one of clauses 1-4, further caused to output the one or more software development insight components for rendering to the software development insight interface.

Clause 6. The apparatus of any one of clauses 1-5, wherein each development unit identifier of the one or more development unit identifiers is configured to uniquely identify a development unit, and wherein the development unit comprise at least one of a sprint, a story, an epic, or an initiative.

Clause 7. The apparatus of any one of clauses 1-5, wherein the multi-resource software development work graph structure comprises a plurality of code pull request nodes and a plurality of issue object nodes, each issue object in the issue object set is represented by an issue object node of the plurality of issue object nodes, and each code pull request in the code pull request set is represented by a code pull request node of the plurality of code pull request nodes and connected to an issue object node representing an issue object in the issue object set via a multi-resource software development work graph structure edge.

Clause 8. The apparatus of any one of clauses 1-5, wherein the one or more software development insight components is generated based on user interaction with a client device.

Clause 9. The apparatus of any one of clauses 1-5, wherein the multi-resource software development work graph structure is traversed to identify relationship data associated with the code pull request set and the issue object set, wherein the relationship data comprises dependency relationship data with respect to the code pull request set and the issue object set.

Clause 10. The apparatus of any one of clauses 1-5 or 9, wherein determining the one or more software development insight components comprises generating, utilizing a machine learning model and based at least in part on the relationship data, one or more inferences, and generating the one or more software development insight components based on the one or more inferences.

Clause 11. The apparatus of any one of clauses 1-5 or 9-10, wherein the one or more inferences is indicative of a bottleneck.

Clause 12. The apparatus of clauses 1-5, wherein the software development insight interface is rendered to a client device.

Clause 13. The apparatus of any one of clauses 1-5, wherein the one or more software development insight components comprise actionable insight.

Clause 14. The apparatus of any one of clauses 1-5, wherein the one or more software development insight components comprise a resource recommendation.

Clause 15. The apparatus of any one of clauses 1-5, wherein the at least one non-transitory memory and the program code configured to, with the at least one processor, cause the apparatus to detect user interaction with a project management user interface, determine the one or more development unit identifiers based on the user interaction, and retrieve the multi-resource software development work graph structure based on the one or more development unit identifiers.

Clause 16. An apparatus configured for generating a multi-resource software development work graph structure, the apparatus comprising at least one processor, and at least one non-transitory memory including program code, the at least one non-transitory memory and the program code configured to, with the at least one processor, cause the apparatus to identify a plurality of resource objects.

Clause 17. The apparatus of clause 16, wherein each resource object is associated with resource data.

Clause 18. The apparatus of any one of clauses 16-17, further caused to for each resource object, extract one or more features based on the resource data associated with the resource object.

Clause 19. The apparatus of any one of clauses 16-18, further caused to for each resource object, identify, based on the one or more features, a resource object relationship between the resource object and each other resource object of the plurality of resource objects.

Clause 20. The apparatus of any one of clauses 16-19, further caused to generate, based on each resource object relationship for each resource object, a multi-resource software development work graph structure interrelating the plurality of resource objects.

Clause 21. The apparatus of any one of clauses 16-20, wherein the multi-resource software development work graph structure comprises a plurality of resource object nodes and a plurality of resource object relationship edges, wherein a resource object node of the plurality of resource object nodes is connected to at least one other resource object node of the plurality of resource object nodes via at least a resource object relationship edge of the plurality of resource object relationship edges, wherein the resource object relationship edge represents the resource object relationship associated with the resource object node and the at least one other resource object node.

Clause 22. The apparatus of any one of clauses 16-20, wherein the plurality of resource objects comprise at least one code pull request set and at least one issue object set.

Clause 23. The apparatus of any one of clauses 16-20, wherein each resource object of the plurality of resource objects is identified in response to one or more software development events.

Clause 24. The apparatus of any one of clauses 16-20, wherein the plurality of resource objects are associated with one or more development unit identifiers.

Clause 25. The apparatus of any one of clauses 16-20, wherein identifying the plurality of resource objects comprises retrieving each resource object of the plurality of resource objects from a resource object repository.

Clauses 26. The apparatus of any one of clauses 16-20, wherein the apparatus is further caused to generate an insight prediction machine learning model configured to generate software insight development components based on the multi-resource software development work graph structure.

Clause 27. An apparatus comprising at least one processor, and at least one non-transitory memory including program code, the at least one non-transitory memory and the program code configured to, with the at least one processor, cause the apparatus to identify a multi-resource software development work graph structure representing relationships among a plurality of resource objects.

Clause 28. The apparatus of clause 27, wherein the plurality of resource objects comprise at least one code pull request set and at least one an issue object set that are associated with one or more development unit identifiers.

Clause 29. The apparatus of any one of clauses 27-28 further caused to train, based on the multi-resource software development work graph structure, an insight prediction machine learning model configured for generating software development insight components based on the multi-resource software development work graph structure.

Clause 30. The apparatus of any one of clauses 27-29 further caused to identify one or more software development events associated with the one or more development unit identifiers.

Clause 31. The apparatus of any one of clauses 27-30 further caused to update, based on the one or more software development events, the multi-resource software development work graph structure.

Clause 32. The apparatus of any one of clauses 27-31, wherein the at least one non-transitory memory and the program code configured to, with the at least one processor, further cause the apparatus to re-train the insight prediction machine learning model based on the updated multi-resource software development work graph structure.

Clause 33. The apparatus of any one of clauses 27-31, wherein the one or more software development events are associated with at least one un-graphed code pull request, and wherein updating the multi-resource software development work graph structure comprises extracting one or more features from the at least one un-graphed code pull request.

Clause 34. The apparatus of any one of clauses 27-31, wherein the one or more software development events are associated with at least one un-graphed issue object set, and wherein updating the multi-resource software development work graph structure comprises extracting one or more features from the at least one un-graphed issue object set.

Clause 35. The apparatus of any one of clauses 27-31, wherein the one or more software development events are associated with at least one un-graphed code pull request and at least one un-graphed issue object, and wherein updating the multi-resource software development work graph structure comprises extracting one or more features from the at least one un-graphed code pull request and the at least one un-graphed issue object.

Clause 36. The apparatus of any one of clauses 27-31, wherein the insight prediction machine learning model comprises a supervised machine learning model.

Clause 37. The apparatus of any one of clauses 27-31, wherein the insight prediction machine learning model comprises a neural network.

Clause 38. A computer program product comprising at least one non-transitory computer-readable storage medium having computer-readable program code portions stored therein, the computer-readable program code portions configured to perform operations in accordance with any of the foregoing Clauses Clause 39. A computer-implemented method, comprising operations in accordance with any of the foregoing Clauses.

What is claimed is:

1. An apparatus for outputting software development insight components to a software development insight interface, the apparatus comprising at least one processor, and at least one non-transitory memory including program code, the at least one non-transitory memory and the program code configured to, with the at least one processor, cause the apparatus to:

retrieve a multi-resource software development work graph structure associated with one or more development unit identifiers, wherein the multi-resource software development work graph structure is configured to represent relationships among a code pull request set and an issue object set that are associated with the one or more development unit identifiers, wherein the multi-resource software development work graph structure comprises a plurality of code pull request nodes representative of the code pull request set and a plurality of issue object nodes representative of the issue object set, wherein the plurality of code pull request nodes and the plurality of issue object nodes are connected via one or more edges of the multi-resource software development work graph structure;

receive a software development context object associated with the one or more development unit identifiers;

generate one or more software development insight components by traversing the multi-resource software development work graph structure based on the software development context object, wherein the one or more software development insight components comprise one or more graphical interface components configured to convey one or more recommendations; and output the one or more software development insight components for rendering to the software development insight interface.

2. The apparatus of claim 1, wherein each development unit identifier of the one or more development unit identifiers is configured to uniquely identify a development unit, and wherein the development unit comprise at least one of a sprint, a story, an epic, or an initiative.

3. The apparatus of claim 1, wherein the one or more software development insight components is generated based on user interaction with a client device.

4. The apparatus of claim 1, wherein the multi-resource software development work graph structure is traversed to identify relationship data associated with the code pull request set and the issue object set, wherein the relationship data comprises dependency relationship data with respect to the code pull request set and the issue object set.

5. The apparatus of claim 4, wherein determining the one or more software development insight components comprises:

generating, utilizing a machine learning model and based at least in part on the relationship data, one or more inferences; and generating the one or more software development insight components based on the one or more inferences.

6. The apparatus of claim 5, wherein the one or more inferences is indicative of a bottleneck.

7. The apparatus of claim 1, wherein the software development insight interface is rendered to a client device.

8. The apparatus of claim 1, wherein the one or more software development insight components comprise actionable insight.

9. The apparatus of claim 1, wherein the one or more software development insight components comprise a resource recommendation.

10. The apparatus of claim 1, wherein the at least one non-transitory memory and the program code configured to, with the at least one processor, cause the apparatus to:

detect user interaction with a project management user interface;

determine the one or more development unit identifiers based on the user interaction; and retrieve the multi-resource software development work graph structure based on the one or more development unit identifiers.

11. A computer-implemented method for outputting software development insight components to a software development insight interface, the computer-implemented method comprising:

retrieving a multi-resource software development work graph structure associated with one or more development unit identifiers, wherein the multi-resource software development work graph structure is configured to represent relationships among a code pull request set and an issue object set that are associated with the one or more development unit identifiers, wherein the multi-resource software development work graph structure comprises a plurality of code pull request nodes representative of the code pull request set and a plurality of issue object nodes representative of the issue object set, wherein the plurality of code pull request nodes and the plurality of issue object nodes are connected via one or more edges of the multi-resource software development work graph structure;

receiving a software development context object associated with the one or more development unit identifiers;

generating one or more software development insight components by traversing the multi-resource software development work graph structure based on the software development context object, wherein the one or more software development insight components comprise one or more graphical interface components configured to convey one or more recommendations; and outputting the one or more software development insight components for rendering to the software development insight interface.

12. The computer-implemented method of claim 11, wherein each development unit identifier of the one or more development unit identifiers is configured to uniquely identify a development unit, and wherein the development unit comprise at least one of a sprint, a story, an epic, or an initiative.

13. The computer-implemented method of claim 11, wherein the one or more software development insight components is generated based on user interaction with a client device.

14. The computer-implemented method of claim 11, wherein the multi-resource software development work graph structure is traversed to identify relationship data associated with the code pull request set and the issue object set, wherein the relationship data comprises dependency relationship data with respect to the code pull request set and the issue object set.

15. The computer-implemented method of claim 14, wherein determining the one or more software development insight components comprises:

generating, utilizing a machine learning model and based at least in part on the relationship data, one or more inferences; and generating the one or more software development insight components based on the one or more inferences.

16. The computer-implemented method of claim 15, wherein the one or more inferences is indicative of a bottleneck.

17. The computer-implemented method of claim 11, wherein the software development insight interface is rendered to a client device.

18. A computer program product for outputting software development insight components to a software development insight interface, the computer program product comprising at least one non-transitory computer-readable storage medium having computer-readable program code portions stored therein, the computer-readable program code portions configured to:

retrieve a multi-resource software development work graph structure associated with one or more development unit identifiers, wherein the multi-resource software development work graph structure is configured to represent relationships among a code pull request set and an issue object set that are associated with the one or more development unit identifiers, wherein the multi-resource software development work graph structure comprises a plurality of code pull request nodes representative of the code pull request set and a plurality of issue object nodes representative of the issue object set, wherein the plurality of code pull request nodes and the plurality of issue object nodes are connected via one or more edges of the multi-resource software development work graph structure;

receive a software development context object associated with the one or more development unit identifiers;

generate one or more software development insight components by traversing the multi-resource software development work graph structure based on the software development context object, wherein the one or more software development insight components comprise one or more graphical interface components configured to convey one or more recommendations; and output the one or more software development insight components for rendering to the software development insight interface.

\* \* \* \* \*